April 5, 1966   R. A. COVINGTON, JR., ETAL   3,244,781
CONTINUOUS EXTRUSION AND ORIENTATION OF PLASTIC TUBING
Filed March 14, 1962   9 Sheets-Sheet 1
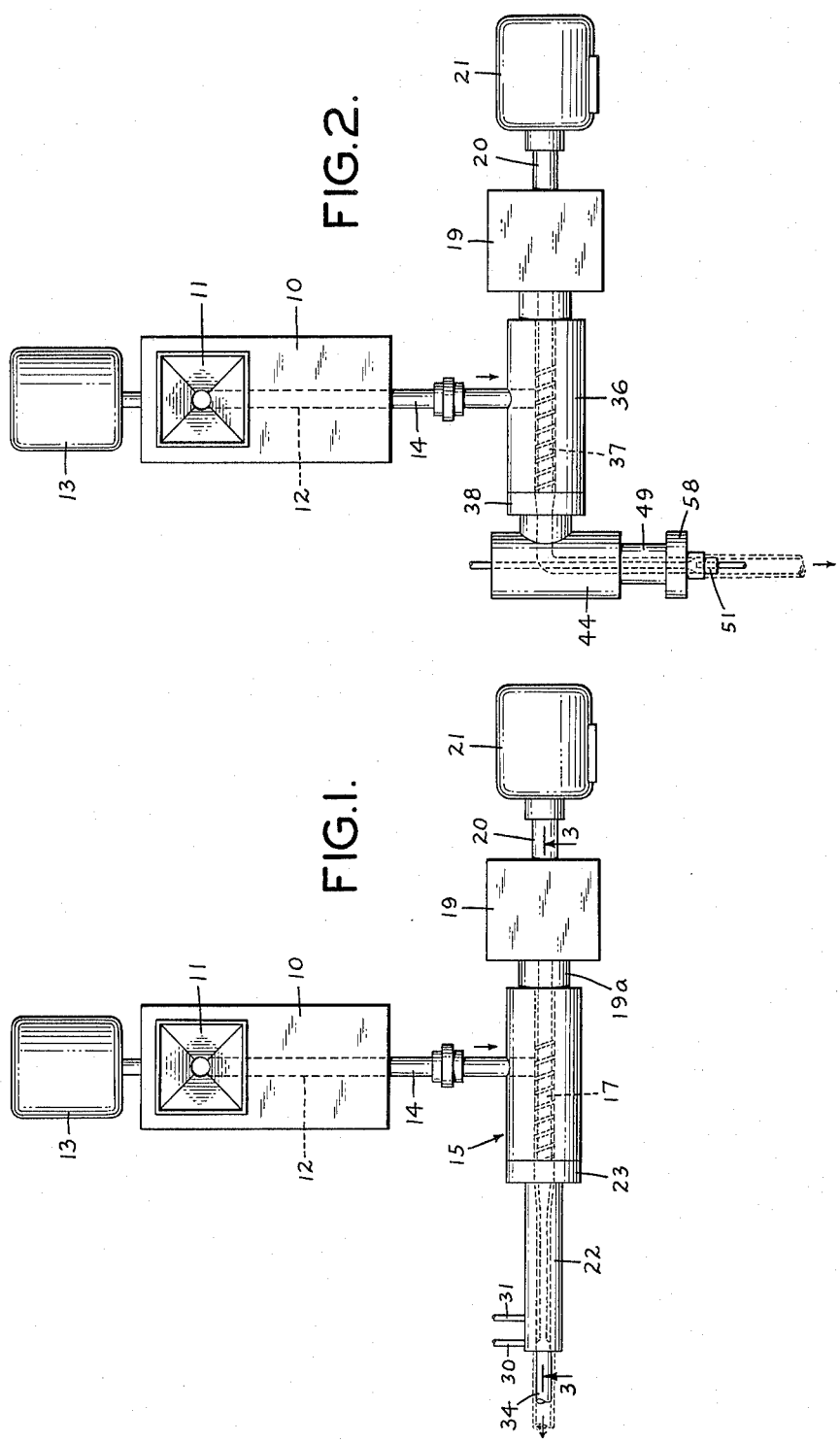

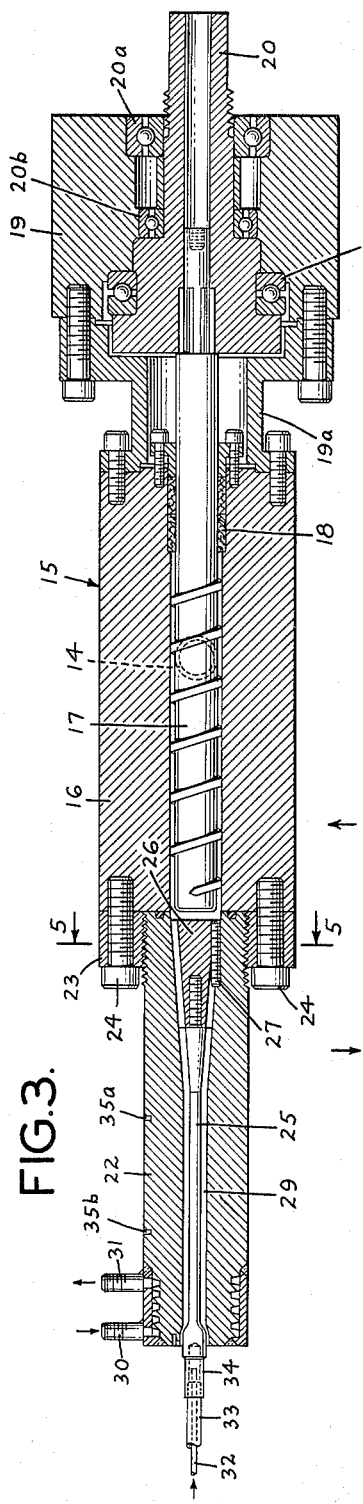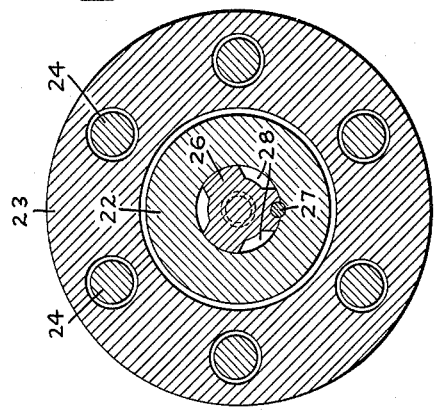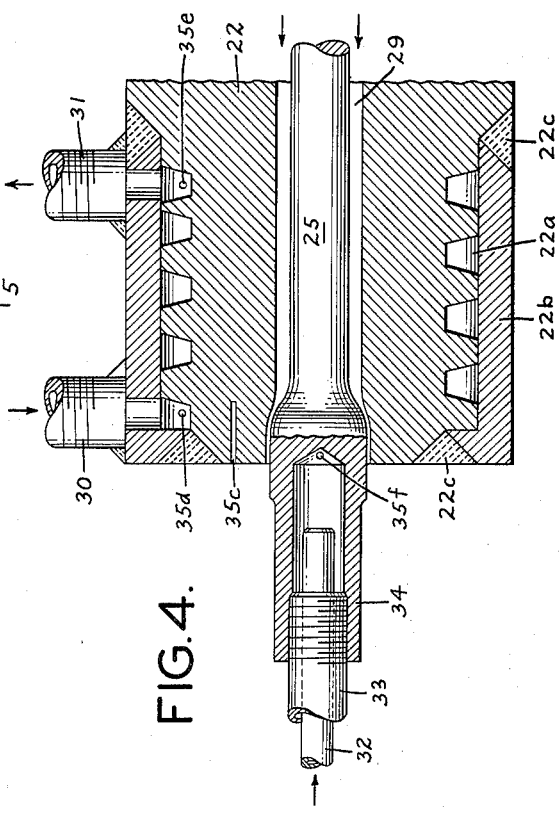

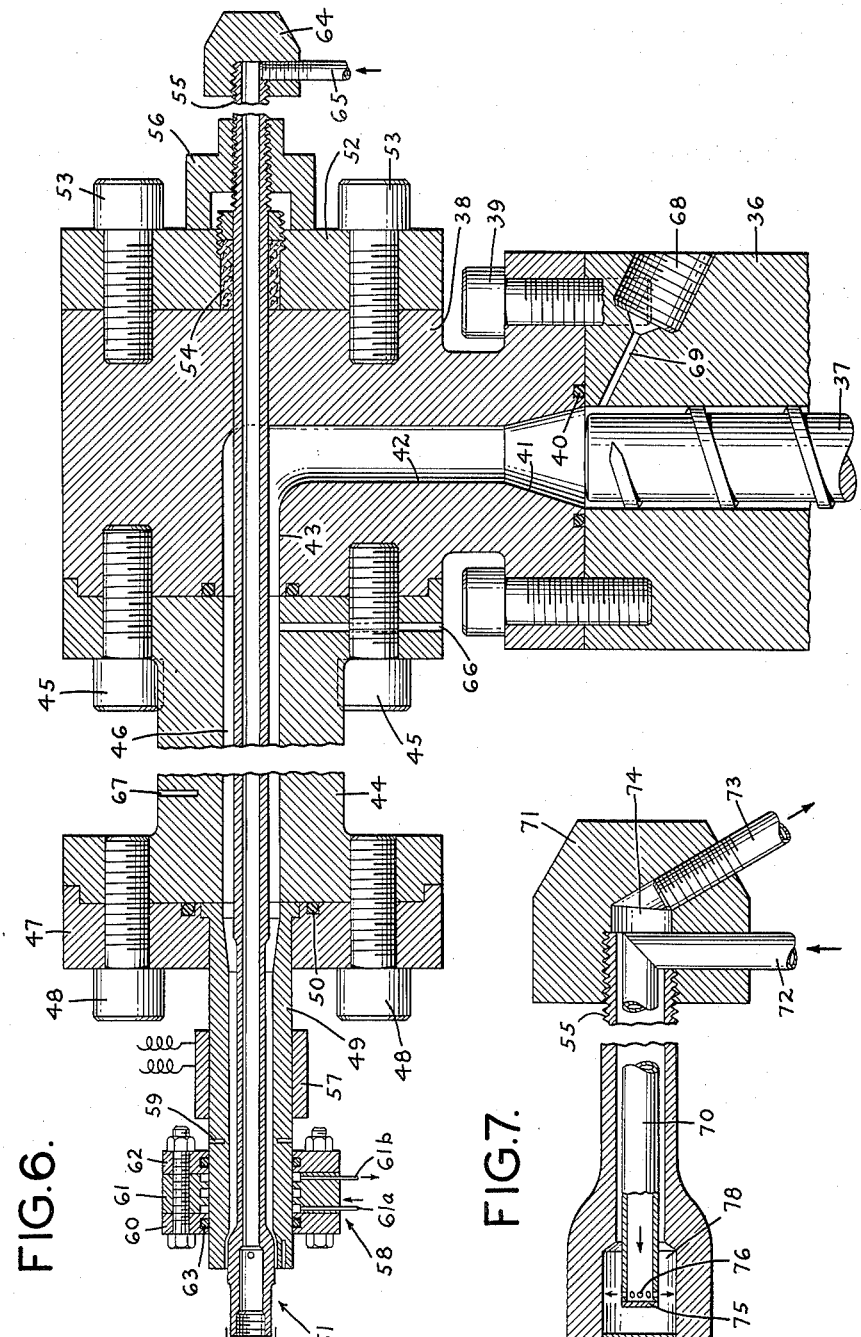

April 5, 1966  R. A. COVINGTON, JR., ETAL  3,244,781
CONTINUOUS EXTRUSION AND ORIENTATION OF PLASTIC TUBING
Filed March 14, 1962  9 Sheets-Sheet 4
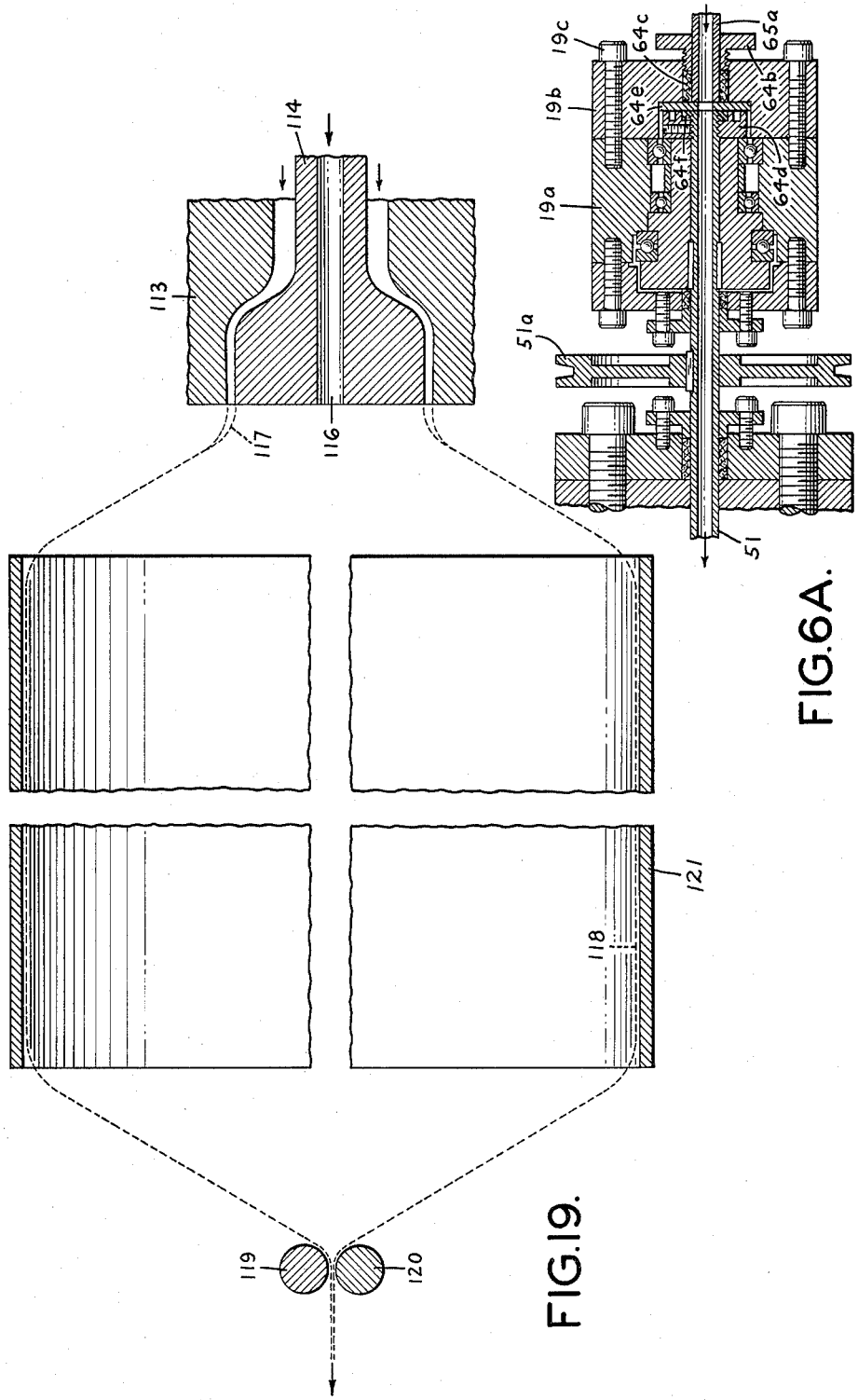

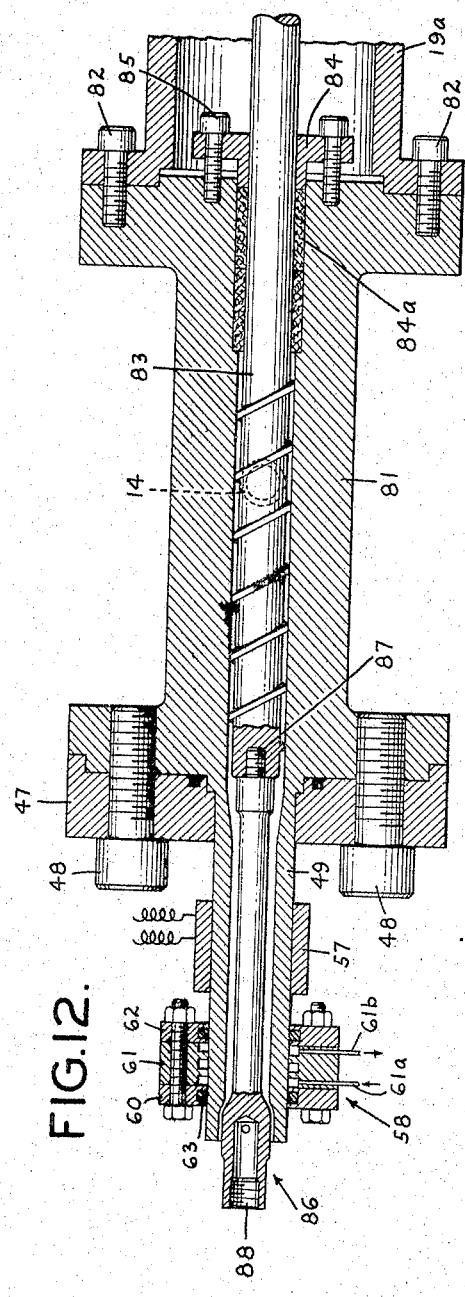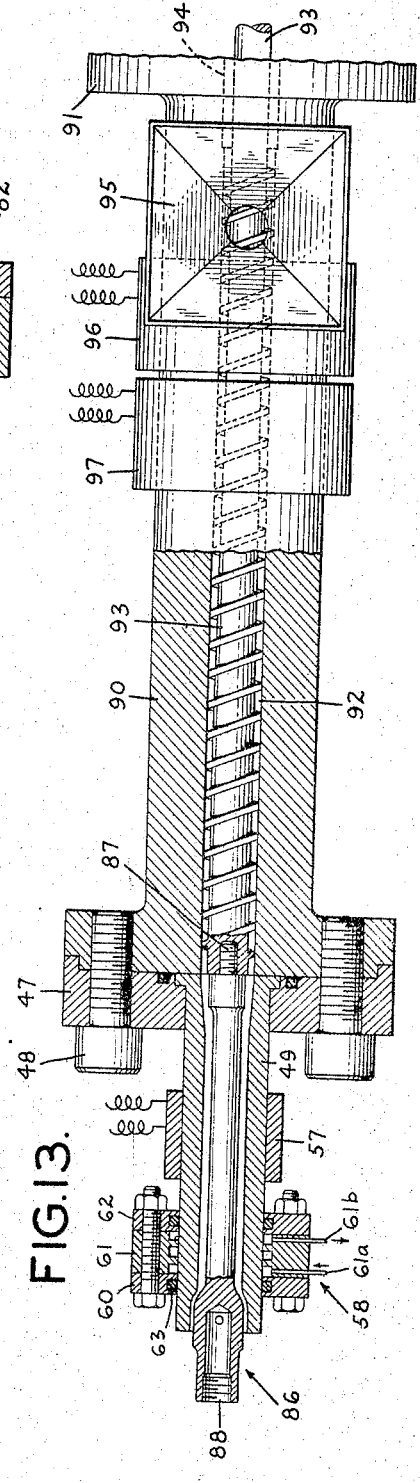

April 5, 1966  R. A. COVINGTON, JR., ETAL  3,244,781
CONTINUOUS EXTRUSION AND ORIENTATION OF PLASTIC TUBING
Filed March 14, 1962  9 Sheets-Sheet 8
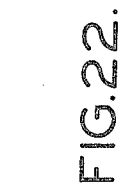
FIG. 22.
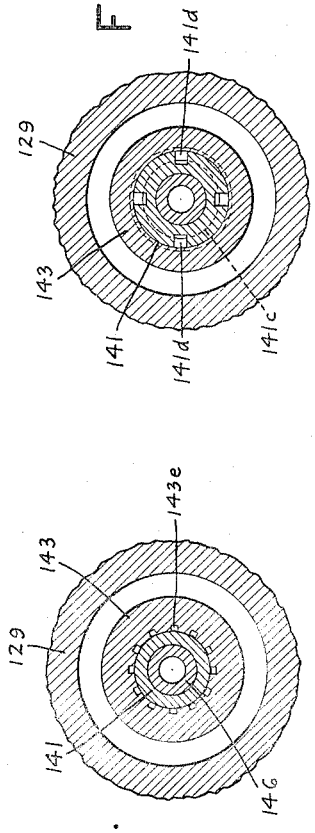
FIG. 20.
FIG. 21.

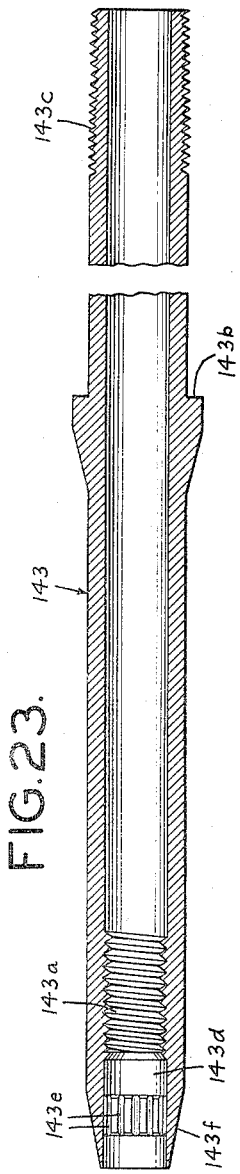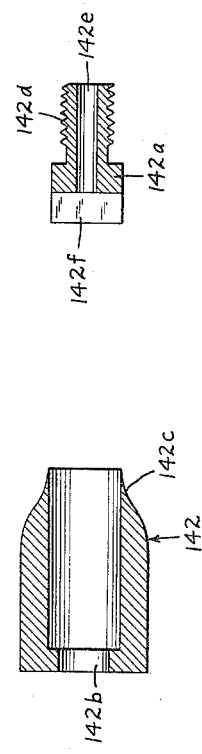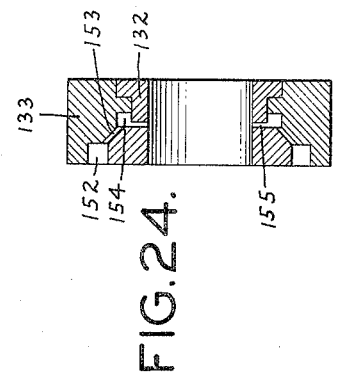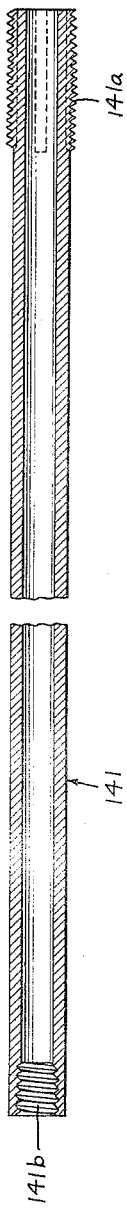

United States Patent Office 3,244,781
Patented Apr. 5, 1966

3,244,781
CONTINUOUS EXTRUSION AND ORIENTATION
OF PLASTIC TUBING
Robert A. Covington, Jr., Northwood, Wilmington, Del.,
Rex. E. Dickey, Huntington, Shelton, Conn., Nathaniel
C. Wyeth, Rosedale, Pa., and Edward M. Yacko,
Bridgeport, Conn., assignors to Remington Arms Company, Inc., Bridgeport, Conn., a corporation of Delaware
Filed Mar. 14, 1962, Ser. No. 182,152
17 Claims. (Cl. 264—95)

This is a continuation-in-part of application Serial No. 141,394, filed September 28, 1961, now abandoned.

This invention relates to the initial formation of relatively thick walled tubing or relatively stiff strips from a mass of synthetic resin of high crystallinity, and the subsequent treatment of such tubing or strips to produce thinner walled tubular members or thinner strips of substantial tensile strength in at least one direction. Its primary purpose has been to produce tubular members capable of retaining their desired tubular form under normal conditions of use and capable of returning to such form after removal of certain abnormal forces tending to distort the same, but also capable of retaining a distorted form upon application of appropriate forces under predetermined conditions. The invention involves a novel combination of steps for producing the desired tubular members in a most simple, efficient and economical manner and a novel combination of means for carrying out such method. Also the invention is adapted for the production of strip material having improved tensile strength in at least one direction and films having exceptional strength in all directions.

As will be apparent from the following detailed discussion of the invention, it is particularly adapted for the production of tubular members, of the character indicated, for a variety of different purposes. It is exceptionally well suited, however, for the production of casings for shotshells, when appropriate selection is made of the starting material employed in the practice of the invention.

Briefly, a major aspect of the invention contemplates the forming of thick walled tubing from a mass of an appropriate starting material under a high pressure and the continuous advance of the tubing, under such pressure of an increased pressure provided by a booster pump, through a passage of annular cross-section which, at a certain point along its length, increases rapidly in mean diameter and either simultaneously or subsequently decreases in cross-sectional area. Through appropriate expedients the initial, relatively thick walled tubing, after it is first formed and as it advances along said passage, is gradually brought to a temperature at which the plastic of which it is formed is capable of molecular orientation. Thus, prior to the forcing of the tubing through the portion of the passage mentioned, which serves to increase the mean diameter and reduce the cross-sectional area thereof, it is in a condition which makes possible the biaxial orientation of the molecules of the plastic as a result of the increase in dimension of the original tubing in both a radial and a longitudinal direction. It will be appreciated that the reduction in cross-sectional area of the wall of the original tubing brings about a corresponding increase in the length of the final tubing. X-ray studies of polyethylene tubing produced in accordance with this invention indicate that a beneficial alinement of crystal axes has been obtained. In certain applications of the invention it is also possible to produce shear-induced orientation of the plastic through the relative rotation of the members which provide the inner and outer surfaces of the passage through which the plastic is being formed.

Preferably the temperature of the plastic at the time it is being molecularly oriented should be between about 20° F. and 50° F. below the crystalline melting point under the pressure to which the mterial is being subjected. Since the crystalline melting point is higher, at the relatively high pressures employed than at normal atmospheric pressure, the orientation may take place at correspondingly higher temperatures. While the orientation could be effected at a lower temperature than indicated above, it is impracticable to reduce the temperature too far below the crystalline melting point because of the excessive pressures then required to force the material at a suitable rate through the forming and shaping passages.

The increase in both the mean diameter of the original tubing and in the length of the same has been found to produce the same effect as the stretching of the tubing in the two directions by appropriate stretching forces. This is particularly startling in relation to the longitudinal extension of the tubing, which, as explained, is achieved by the force of extrusion rather than by a pulling or other conventional stretching force.

In the practice of the invention it has been found desirable to maintain certain predetermined relationships between the various dimensions of the tubing in the several stages of formation of the molten plastic into the original thick walled tubing and then into the somewhat thinner walled tubing of greater mean diameter. The desired extent of increase in mean diameter of the tubing and the increase in length of the tubing formed from a particular volume or mass of the material forming the tubing, which is related to the cross-sectional area of the wall of the tubing, depends upon the desired use of the tubing. For cartridge casing purposes, it has been found desirable to increase the mean diameter to about 1.20 to 1.60 times the mean diameter of the tubing as first formed. For the same purpose, it has been found desirable to decrease the cross-sectional area of the wall of the tubing to such an extent that the final tubing has a cross-sectional area in its wall structure which is about 20% to 30% of the cross-sectional area of the wall of the original tubing formed from the molten mass. This means that the length of the final tubing formed from a given volume or mass of the material being used is about 3.5 to 5 times that of the original tubing formed from the molten plastic. For other purposes it may be desirable to produce other relationships between the specified dimensions of the original and final tubing, depending upon the transverse and longitudinal strength requirements of the final tubing.

For cartridge casing purposes the preferred plastic material employed in the practice of the present invention is of the type set forth for such purposes in the Covington et al. application Serial No. 37,598, filed on June 21, 1960, now Patent No. 3,103,170, granted on September 10, 1963. Thus it should preferably be a substantially linear polymer having an annealed density above 0.94, a melt index of less than 1.0, and be formed to the extent of at least 90% of ethylene. However, for other purposes certain of the advantages of the invention may be obtained through the use of a wide variety of other synthetic, crystalline plastics capable of molecular orientation in the manner contemplated by the present invention. In general it may be said that plastics suitable for treatment in accordance with the invention include high density polyethylenes, nylon, polyethylene terephthalate, acetal resins, and the like.

While for most purposes special advantages are derived from the orientation of the molecules of the synthetic plastic employed in directions both transverse to and longitudinal of the direction of advance of the originally formed plastic mass, certain advantages of the invention may be derived from molecular orientation of the plastic in only one direction. Thus, in producing bar stock having exceptional tensile strength in a longitudinal direction, certain aspects of the invention may be so applied as to bring about longitudinal orientation of the molecules of the plastic by increasing the length of the final product formed from a given volume or mass of the molten plastic, as compared with the length of the original bar formed from said given volume or mass of plastic, without bringing about any transverse orientation of the molecules. On the other hand, an original bar form of the plastic may be subjected to both longitudinal and transverse molecular orientation, to obtain the greater advantages of the invention, in the production of a sheetlike final product by a continuously performed extruding and bidirectional orienting procedure.

Also the invention is adapted for the production of relatively thin films of synthetic plastics, having exceptional tensile strength both transversely and longitudinally, by first forming a relatively thick walled tubing of such a plastic, then forcing it under a high pressure, while at a temperature near but below the crystalline melting point under the pressure employed, through an orifice under conditions which will provide both transverse and longitudinal orientation of the molecules, and then producing further biaxial orientation of the molecules by expanding the resulting tubing to a substantial extent by an internally applied air or other fluid pressure.

To enable the continuous formation and biaxial orientation of the plastic in accordance with the invention, at commercially practicable rates, it has been found necessary to subject the material to quite high pressures, exceeding 15,000 p.s.i. and preferably at least 20,000 p.s.i., when no lubrication is provided between the plastic and the forming and shaping surfaces. However, when properly controlled lubrication is provided the pressure may be reduced to as low as 7,000 p.s.i. Conventional extrusion equipment is not capable of attaining the high pressures required without lubrication. Accordingly, when a conventional extruder is used to convert the original mass of solid plastic material into a molten mass which is to be advanced through a forming passage, it is necessary, in the absence of lubrication, to employ a booster to increase the pressure under which the material is being advanced. The conventional extruder serves to create a pressure of about 10,000 p.s.i. and the booster then increases this to above 15,000 p.s.i. before the material is forced through the forming passage. It has been found, however, that an extruder of special construction may be provided which will deliver the molten plastic under an adequate pressure, up to 25,000 p.s.i., to serve the purposes of the invention, without the necessity of providing a booster.

A feature of a preferred embodiment of the invention involves the provision of special means for delivering a thin film of lubricant to both the outer and the inner surface of plastic tubing as it is being formed. The arrangement is such that the lubricant film is applied to the tubular mass of plastic at the point along its path of movement at which it begins to solidify, from the molten state, at its inner and outer surfaces. It has been found important to control quite accurately the amount of lubricant delivered, so as to provide a quite thin film without any appreciable excess. The provision of such a film not only reduces the pressure required to force the plastic uniformly at a desired rate through the forming and shaping passages, but it also makes possible the earlier and more rapid cooling of the plastic from the molten to the solid state, and thus facilitates the maintenance of the desired temperature in the shaping region of the die structure. This, in turn, makes possible the more rapid formation of the final, biaxially worked tubing. The cooling of the mass as it is forced along may be to a lower temperature than is desired in the shaping region and it may then be reheated to a desired extent to insure uniform results. Such reheating may be readily regulated.

With the foregoing purposes, features and general principles in mind, certain embodiments of the invention will now be described in greater detail in relation to the accompanying drawings. It should be understood that certain of the embodiments of the invention to be described serve to provide only some of the advantages of the invention while others serve to provide the major and more startling advantages of particular applications of the invention. Thus, while it is believed that some important and highly desirable results are obtained from the use of only some of the special features of the invention, even more startling results are obtained from the novel combination of all of the major features of the invention which result, for example, in the production of plastic tubing in a most economical manner by continuous extrusion of a molten plastic under high pressure into a relatively thick-walled tubular form, followed by a controlled cooling and possible reheating of the initial tubing, and then a biaxial working of the tubing under substantial pressures into its final stable form. The resulting product has exceptional properties as to transverse and longitudinal tensile strength, resistance to stress cracking, dimensional stability and other highly desirable characteristics.

In the practice of the present invention it has been found unnecessary to subject the biaxially oriented tubing to a separate heat setting treatment, to insure dimensional stability, as has been found necessary in prior procedures in which thick-walled tubing is first simply extruded into a solid phase form and then sections of such preformed tubing are subjected in a second, independent stage of the process to longitudinal and circumferential stretching. Thus the present invention not only reduces the amount of heat required for the overall treatment of the plastic but it also eliminates the need for a number of time consuming separate steps in the formation of the desired end product.

According to a preferred embodiment of this invention, a suitable plastic in pellet or other solid, subdivided form, is fed through a hopper into a continuously operating extruder in which it is heated well above the crystalline melting point of the plastic and is forced under substantial force through a forming passage, while the material is in a molten state, and then through a shaping passage which serves to orient the molecules of the plastic in at least one direction. During its advance through the shaping passage the material is brought to a temperature sufficiently below its crystalline melting point but relatively close thereto, at the pressure being maintained, to enable the material to accept orientation, and the plastic is then discharged from the shaping passage into a region under ambient or atmospheric pressure at a temperature at which the orientation will be retained at such reduced pressure. The resulting product will have highly desirable properties, such as highly increased tensile strength, in either or both its longitudinal and transverse directions, as compared with tubes or the like which are extruded in the conventional manner without any attempt to effect molecular orientation in any direction in the course of converting a molten mass of plastic into a desired shape.

A preferred embodiment of the invention and various modifications thereof will now be described in greater detail by refence to the accompanying drawings, in which:

FIG. 1 is a plan view showing an extruder and a booster pump arranged to deliver molten plastic material under high pressures to a tube-forming and shaping die disposed coaxially with the booster pump;

FIG. 2 is a view similar to FIG. 1 showing a cross-head arrangement for carrying out the tube-forming and shaping operations in a direction at right angles to the line of delivery of the molten plastic by the booster pump;

FIG. 3 is a vertical sectional view taken along the line 3—3 of FIG. 1;

FIG. 4 is an enlarged view in vertical section through the left hand portion of the tube-forming and shaping dies of FIG. 3;

FIG. 5 is a cross-sectional view taken along the line 5—5 of FIG. 3;

FIG. 6 is a horizontal sectional view through the cross-head die structure of FIG. 2 and its connection with the booster pump;

FIG. 6A is a fragmentary view showing means for rotating the mandrel of FIG. 6;

FIG. 7 is a detail view in axial section through the mandrel of a cross-head type of construction provided with a modified arrangement for cooling the tube shaping portion of the mandrel;

FIG. 12 is a vertical sectional view through the booster pump and the tube-forming and shaping die structure of an arrangement adapted to provide continuous rotation of the male die member or mandrel;

FIG. 13 is a view, partly in plan and partly in horizontal section, showing a modified arrangement having an extruder capable of delivering the molten plastic under sufficient pressure for the purposes of the invention without the necessity of providing a booster pump;

FIG. 19 is a schematic view of an arrangement by which tubing formed and biaxially oriented in accordance with the invention may be further stretched and oriented into a form suitable for film purposes;

FIG. 20 is a longitudinal sectional view through a cross-head member and connected forming and shaping members of a modified apparatus having provisions for lubrication of the outer and inner surfaces of a tubular member being formed and biaxially oriented;

FIG. 21 is a cross-sectional view taken along the line 21—21 of FIG. 20;

FIG. 22 is a cross-sectional view taken along the line 22—22 of FIG. 20;

FIG. 23 is a longitudinal sectional view through a conduit provided in the structure of FIG. 20 for the delivery of lubricant to the inner surface of the tubular member being formed;

FIG. 24 is an enlarged sectional view through a ring structure embodied in the unit of FIG. 20 for the delivery of lubricant to the outer surface of the tubular member being formed;

FIG. 25 is a longitudinal sectional view through a main element of the mandrel member embodied in the construction of FIG. 20;

FIG. 26 is a longitudinal sectional view through a head member of the mandrel structure; and FIG. 27 is a longitudinal sectional view through an element of the mandrel structure which serves to retain the head member thereon and to discharge a coolant therefrom.

Figure 9:
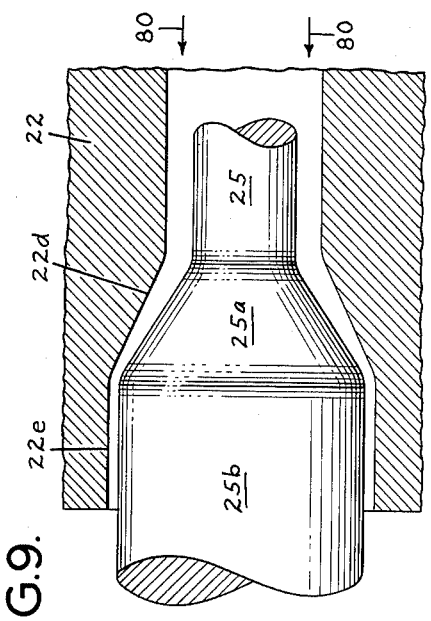
FIGS. 9, 10 and 11 are views similar to FIG. 8 but show modified forms of the shaping or orienting surfaces on the die elements.
Figure 11:
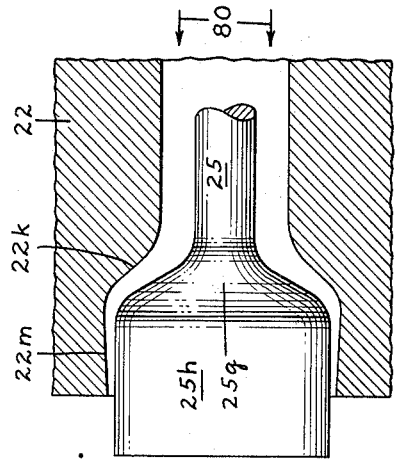

Referring now to the drawings, there are shown a number of experimental units constructed in accordance with the invention. In FIG. 1 a conventional extruder 10 is depicted which may suitably be of the type sold as Model 55 by the National Rubber Machinery Company. This has a capacity of 30–42 lbs./hr. and has a screw 1½" in diameter and 30" long. It is equipped with a 5 H.P. motor capable of operating the screw at speeds between 8 and 80 r.p.m. The material to be extruded is introduced through a hopper 11. Such material may be in pellet or other subdivided solid form. The screw 12 of the extruder is connected with a motor 13 for driving the same at any desired speed within the limits mentioned. As the material to be extruded is advanced by the screw, assuming it to be linear polyethylene or of similar character, it is heated to a temperature between about 400° and 475° F., which is well above the crystalline melting point and converts the original solid material into a fluid state. The screw is adapted to discharge the molten mass of the plastic material through a pipe 14 under a pressure of about 10,000 p.s.i. into the chamber of a booster pump 15. The latter (FIG. 3) comprises a cylindrical member 16 having a passage extending longitudinally through its center in which is mounted for rotation a screw member 17. As shown, inlet pipe 14 introduces the molten mass into the path of the screw 17 at a slight distance inwardly from its upstream end. A packing gland 18 surrounding the shank of the screw, and mounted within the cylinder 16, serves to prevent leakage of the plastic material at the upstream end of the cylinder. An annular bracket 19a connected with the right end of the cylinder 16 serves to connect the latter with a bearing block 19 within which is rotatably mounted a hollow drive connection member 20 which is adapted to be driven, through suitable connections including reduction gearing, from an electrical motor 21 (FIG. 1). This motor may suitably be a 5 H.P. motor adapted to drive the connection member 20, and hence the screw 17, at any desired speed between 5 and 50 r.p.m. The member 20 is mounted within the block or housing 19 on ball or roller bearings 20a and 20b which take the radial forces while thrust bearing elements 20c, which may be of ball bearing construction, are provided to take the thrust forces resulting from the pressure within the cylinder 16. The shank of screw 17 has a splined connection with the member 20 but has a slight diametral clearance in relation to the opening through the latter, amounting to, say, 0.007". This permits a slight floating of the screw 17 in relation to its driving means and allows the screw to seek its proper center of rotation with respect to the cylinder 16, thus avoiding binding. The free end of the screw 17 is substantially flush with the left end of the cylinder 16. Secured to the latter and extending coaxially therefrom is a cylinder 22 providing the female die element of the tube-forming and shaping devices. The cylinder 22 is provided with screw threads at its right end (FIG. 3) arranged to receive an annular member 23 which is in turn secured by screws 24 to the left end of the cylinder 16. An O-ring mounted in an annular groove in the right end of the cylinder 22 serves to prevent leakage of the molten mass in a radial direction at the juncture of the cylinders 16 and 22. The circumferential surfaces of both of the cylinders 16 and 22 are preferably covered with thermal insulation of any suitable character.

Within the cylinder 22 there is mounted a mandrel 25 which is of cylindrical form in a region inwardly of its two ends, over the major portion of the length of the mandrel. The right end of the latter, however, is of frusto-conical form, having an included angle of about 7°, and is provided with a projecting screw having threaded engagement with a tapered spider element 26. This element, as best shown in FIG. 5, has radially extending ribs or projections adapted to fit snugly within a frusto-conical opening at the right end of the cylinder 22. Such frusto-conical opening extends not only the full length of the spider element but also the length of the frusto-conical portion of the mandrel and has an included angle of the same amount as said portion of the mandrel. A screw 27 having threaded engagement with one of the ribs or projections of the member 26 and also with the wall of cylinder 22 surrounding the longitudinal opening through the latter, serves to prevent turning of the mandrel 25 and holds it in set position. The molten plastic entering the cylinder 16 through the pipe 14 is forced toward the left and its pressure is increased from, say, 10,000 p.s.i. to from 15,000 to 25,000 p.s.i. Under such pressure it is forced through passages 28 provided between the ribs or projections of the spider 26 into the annular space surrounding the mandrel 25. In the intermediate portion 29 of this annular space the mass of molten plastic is formed into a stream of annular cross-section having a relatively great thickness between its inside and outside diameters. As previously stated, the major portion of the cylinder 22 may be covered with heat insulation to prevent unduly rapid cooling of the molten mass before it reaches a point quite close to the shaping passage of the die structure. Toward the same end it has been found desirable to apply one or more electrical heating units to the outer surface of the cylinder 22 in the right hand portion thereof (FIG. 3). The overall length of the mandrel 25 of the experimental unit being described is about 10 inches and, unless a lubricant is introduced between the plastic and the mandrel and die surfaces, it is only in the region of the shaping and orienting portion of the die structure that it is desirable to have the plastic cooled to a point somewhat below its crystalline melting point. In the shaping and forming passage the temperature of the molten mass should be at a point sufficiently below its crystalline melting point, under the pressure being maintained upon it, that it will accept and retain the desired orientation upon longitudinal and radial or transverse increase in the dimension of the tubing formed from a given quantity of plastic, as compared with the original tubular mass formed within the cylindrical portion of the die passage of cylinder 22 from said quantity of plastic. For linear polyethylene it has been found that at normal atmospheric pressure the temperature of the tubing should not be above about 240° F. to insure acceptance and retention of orientation by the plastic. However, in the practice of this invention under pressures above 15,000 p.s.i. it has been found that linear polyethylene can be oriented at temperatures above 230° and up to 260° F. Thus it will be seen that to prevent clogging of the die structure through a too rapid cooling up to a point about an inch or two away from the shaping passage, it becomes necessary to effect a quite rapid cooling of the plastic just in advance of and within the shaping passage so as to enable the plastic to accept orientation. However, because of the pressure under which the plastic is being maintained at this point, it need not be cooled to quite as low a temperature as would be required if the material were under normal atmospheric pressure.

Any suitable means may be provided for cooling the cylinder 22 adjacent its discharge end and for a distance of one to two inches inwardly thereof. For this purpose an appropriate cooling medium may be introduced through a pipe 30 into a spiral passage 22a formed around the periphery of the cylinder 22 by any suitable means. This may, for example, be formed by machining the outer surface of the cylinder 22 and by providing a sleeve 22b around the spirally grooved portion of the cylinder. This sleeve may be secured to member 22 by solder 22c. A pipe 31 serves to discharge the cooling medium from the passage at a point some distance inwardly of the shaping channel of the die structure. This arrangement is such as to insure the establishment of the lowest temperature within the die structure in the shaping region and a gradually higher temperature inwardly of that point. To prevent chilling of the cylinder 22, by the cooling medium mentioned, at a point too far inwardly from the discharge end of the cylinder, the latter may be provided with an annular slit or groove in its outer surface just inwardly of the cooling zone. Such a groove of proper depth will prevent the free transmission of heat between the electrically heated portion of the cylinder and the cooling zone.

As the tubing passes outwardly from the cylinder 22 along the extension 34 of the mandrel 25 it may be found desirable to cool it further, and for this purpose there may be provided a pair of concentric pipes 32 and 33 by which water or other cooling medium may be introduced through the inner pipe 32 into a cavity within the extension 34 at the outer end of the mandrel and this cooling medium may be discharged through the annular passage provided by the tubes 32 and 33. The cooling action thus imparted to the portion 34 of the mandrel also serves to cool the mushroomed portion of the mandrel in the shaping zone. This is important in the production of thick walled tubing, having a wall thickness greater than about .02 inch. For thin walled tubing the cooling action described is not required and the pipes 32 and 33 may be eliminated. The tubes or pipes 32 and 33, when provided, must be of suitable length to accommodate a desired length of extruded and oriented tubing. Thus they may be 20 or 30 feet long or even longer. The completed length of tubing may then be severed at a point adjacent the end of the mandrel and then removed and stored. Spaced spider means may be provided between the pipes 32 and 33 to hold these in properly spaced relation. It is desirable to have the extension 34 of the mandrel about twice as long as the mean diameter of the tubing emerging from the die 22 and most of this extension is preferably of slightly reduced diameter to permit normal shrinkage in diameter of the tubing as it cools and sets.

Since the apparatus depicted and described in this application is particularly constructed for experimental purposes to enable a determination of the advantages of a variety of different arrangements which may be employed for the purposes of the invention, provision is made for determining the temperature in the various regions of the apparatus. It may be found desirable to provide such temperature measuring means even in a regular commercial unit. For this purpose, taps 35a, b, c, d, e and f are provided through the wall of the cylinder 22 in various regions and through the mandrel 25 in a region adjacent its mushroomed shaping portion, for the introduction of thermocouples, or the like, which may be connected with suitable temperature indicators or recording equipment. Taps are also provided through the cylinder 16 at appropriate points for the application of appropriate instruments for the determination of the pressure of the molten plastic mass being advanced through this cylinder. The arrangement of one such tap will be described hereinafter in relation to a modified form of the apparatus which will now be described.

Referring to FIG. 6, this illustrates a cross-head type of tooling applied to the end of the booster pump, the latter being of the same general character as that disclosed in FIG. 3. It involves a main body or housing 36, similar to the member 16 of FIG. 3, having a central bore through which extends the screw 37 of the booster pump. At the end of the body member 36 there is secured a member 38. The latter is secured to the body 36 by bolts 39 passing through an outwardly extending flange of member 38. An O-ring 40, or the like, is preferably provided between the abutting faces of the member 36 and 38 to provide an effective seal. Member 38 has a central passage communicating with that in which the screw 37 is mounted. Its initial portion 41 is of tapered form to converge from the diameter of the opening in member 36 to the somewhat smaller diameter passage 42 which is of L-shape to provide an extension 43 at right angles to the portion 42. Secured to a face of the member 38 which is at right angles to the face which abuts against the member 36, is a pool-shaped connection piece 44. The latter has a flange arranged to receive a series of bolts 45 by which the connection piece is firmly secured to the member 38. An O-ring or other suitable sealing means may be provided between the abutting faces of the members 38 and 44. Connection piece 44 is provided with a central passage or opening 46 alined with the portion 43 of the passage through the member 38. At its outer end the connection piece 44 is flanged and carries a ring member 47 secured by a series of bolts 48. Ring member 47 serves to retain the outer or female die element 49 of the tube-forming and shaping dies of the apparatus. At its right end (FIG. 6) the die member 49 has an outwardly extending flange which fits within a recess in the ring 47. An O-ring 50, or the like, fitted within an annular recess in the inner face of ring 47 is squeezed against the cooperating face of member 44 to effect a seal at the juncture between these parts. Die element 49 has a longitudinally extending passage which communicates with the passage 46 of member 44. Adjacent its right end the passage through member 49 is of the same diameter as the opening 46 but its wall tapers inwardly toward the axis of the passage to merge into a slightly smaller diameter cylindrical portion through which the molten plastic is forced to form an annular mass of desired wall thickness which is then advanced through a shaping or orienting passage of the general character described in connection with FIG. 3.

Within the elongated bore provided by the passages through the members 38, 44 and 49, there is mounted a mandrel 51 which is preferably of tubular form to permit the flow through its central opening of a suitable cooling medium, such as water. Toward its left end, i.e., downstream end, the mandrel is provided with a mushroom formation arranged to cooperate with a suitably shaped portion of the adjacent end of the die memmember 49 to provide for the biaxial orientation of the tubing being formed, in the manner described above. Toward its right end (FIG. 6) the mandrel 51 passes through a snugly fitting cylindrical opening in a wall of the member 38, said opening being alined with the portion 43 of the passage for the molten plastic. Surrounding the mandrel in the region which extends outwardly from the member 38 is a plate 52 secured by bolts 53 to the member 38. Plate 52 is provided with an opening somewhat larger than the outside diameter of the mandrel to permit the introduction of a packing gland 54 around the mandrel. The mandrel extends a suitable distance outwardly beyond the packing gland and is provided with screw threads 55 arranged to cooperate with a locking nut 56 having an annular inner face bearing against the outer face of plate 52. By suitable adjustment of the locking nut 56 the position of the mandrel in a longitudinal direction may be varied slightly to vary the relationship between the cooperating surfaces of the mushroomed portion of the mandrel and the adjacent portions of the die member 49.

As in the case of the construction described in relation to FIGS. 3 and 4, the die member 49 is provided with an electrical heating jacket 57 at about its mid region and is provided with a cooling jacket 58 in a region just in advance of and at the position of the shaping surfaces of the die member 49 and mandrel 51. The cooling jacket, as shown, is formed by three annular, axially alined sections 60, 61 and 62. Member 61 is provided with a spiral groove on its inner surface with which communicates an inlet pipe 61a and an outlet pipe 61b for the passage of a cooling fluid around the outer surface of the die member 49 in the region mentioned. Each of the member 60 and 62 of the cooling jacket is provided with an O-ring 63, or other suitable sealing means, which is squeezed against the outer surface of member 49. To prevent the undue transmission of heat between the regions of the die member 49 which are surrounded, respectively, by the heating jacket 57 and cooling jacket 58, there is preferably provided a narrow annular slot 59 around the periphery of the member 49. This slot may, if desired, be filled with some substance of very poor heat transmission characteristics.

Over the extreme right end of the mandrel 51 there may be mounted a cap 64 having screw threaded engagement with the threads 55. Extending radially into the central opening within the cap 64, which receives the end of the mandrel, is a pipe 65 for the delivery of a cooling fluid to the interior of the mandrel. This cooling fluid passes through the length of the mandrel and is discharged into a pipe (not shown) which may have screw threaded engagement with the left end of the mandrel in the manner of pipe 33 described in connection with FIG. 4. Such pipe needs to be of sufficient length to accommodate a desired length of tubing to be formed.

In lieu of providing the cooling arrangement just described for passing a cooling fluid through the mandrel 51, the right end of the latter may suitably be connected, through a pulley 51a (FIG. 6A) with suitable reduction gearing driven from a motor. With this arrangement a radial and thrust bearing unit 19a of the character shown at 19 in FIG. 3 should be provided at the right of the pulley 51a. In this way the mandrel may be rotated at a suitable speed as the mass of molten plastic is being forced through the various passages described. Such rotation of the mandrel assists in the formation of tubing having a uniform wall thickness and it assists in preventing the formation of objectionable skins at the inner and outer surfaces of the tubular mass of plastic as it is advanced through the die member 49. Also the rotation of the mandrel serves to set up certain shearing forces in the plastic in the shaping region of the die structure which tend to increase the transverse orientation of the molecules of the plastic and thus increase the transverse tensile strength of the final tubing.

If desired, the mandrel 51 may be rotated in the manner described and may also be arranged to receive a cooling medium through its central passage. For this purpose the means for introducing a cooling medium should be located outwardly beyond the pulley 51a and the bearing unit 19a (FIG. 6A) by which the mandrel is rotated and journaled at its right end and a suitable stuffing box arrangement 64c should be provided within a ring 19b secured to the end of the bearing unit 19a by bolts 19c or the like. The end of the mandrel may extend into a cavity within the ring 19b into which a pipe 65a extends. A screw ring 64d is threaded on to the end of the mandrel and a washer 64e abuts against the end of the mandrel. An O-ring 64f may be provided between the washer and the screw ring 64d. The stuffing box 64c may be fitted into the cavity and provided with a threaded closure 64b surrounding the pipe 65a. Turning of the mandrel in relation to the housing 19a, 19b is thus permitted, while the pipe 65a is in communication with the bore of the mandrel.

As in the case of the first embodiment described, provision is preferably made in the apparatus of FIG. 6 for the measurement of the pressure and temperature existing at various points along the line of movement of the plastic mass. Thus, a small diameter pressure tap 66 may be provided in the right hand flange of the member 44 for connection with any suitable form of pressure indicating or recording means. A tap 67 for the reception of a thermocouple, or the like, to determine the temperature existing at a point just in advance of the introduction of the molten plastic into the die member 49 may be provided. For determining the pressure of the molten plastic delivered from the booster pump, the housing 36 of the latter may be provided with a threaded opening 68 of suitable diameter communicating with an opening 69 of quite small diameter extending into the main passage through the booster pump. Suitable means may be inserted in the threaded opening 68 for connecting the latter with a pressure gauge or pressure recording mechanism. In a typical unit, the opening 68 has been made 1⅛" in diameter and the opening 69 has been made 0.13 inch in diameter.

FIG. 7 illustrates a modified arrangement for cooling the mandrel 51. In this arrangement a tube 70 of somewhat smaller outside diameter than the diameter of the passage through the mandrel is arranged to extend through the length of said passage. It may be held in central position in relation to the mandrel passage by spaced spiders, or the like. For this arrangement a cap 71 is applied to the screw threaded portion 55 at the right end of the mandrel, this cap being provided with an inlet tube 72 connected with the tube 70. An outlet tube 73 is also provided in the cap to communicate with a cavity 74 alined with the passage through the mandrel. The arrangement is such that the cooling medium passes through the tube 70 to the left end thereof. This end is closed off by a plate or cap 75, and the cooling medium, such as water, is discharged into the interior of the mushroomed end of the mandrel through small openings 76. A disc 77, securely held within the opening at the mushroomed end of the mandrel serves to provide a chamber 78 into which the cooling medium, such as water, is sprayed through the opening 76 and caused to flash into steam which then returns through the passage between the tube 70 and the inner surface of the passage through the mandrel to the pocket 74 and out through the discharge tube 73. This arrangement has the advantage that the maximum cooling action of the cooling medium is applied to the mushroomed end of the mandrel and cooling of the plastic mass at earlier stages in its passage through the apparatus is quite gradual and may more readily be prevented from reducing the temperature to a point below the crystalline melting point of the plastic.

In all of the foregoing systems, the temperature of the plastic should be permitted to drop gradually as it advances through the forming passage, with a somewhat more rapid temperature drop just in advance of and within the shaping passage in which the plastic is subjected to molecular orientation. Its temperature is maintained at a point above the crystalline melting point up to the point at which the more rapid cooling specified takes place. Otherwise, in the systems above described, there appears to be a tendency to form long wedge-shaped polymer skins with polymer melt in the center, and this leads to unstable flow and even freezing off of the product. It has been found preferable in such systems to maintain temperatures within certain relatively narrow limits at all points along its forming and shaping passage but somewhat wider limits are permissible. The proper maintenance of the desired temperature may be determined by suitably located thermocouples, in the manner explained.

Referring to FIGS. 3 and 4, it has been found preferable, in the formation of tubing from high density, linear polyethylene, to maintain a temperature in the region of the tap 35a at between 360° and 380° F. However, a permissible range is 340° to 390° F. At the point indicated by the tap 35b it has been found preferable to maintain the temperature between 280° and 300° F. but it is permissible to allow this temperature to vary from 270° to 320° F. At the point at which the tap 35c is located it has been found desirable to maintain a temperature between 195° and 210° F., but it is permissible to have this temperature vary between 175° and 260° F.

In the various forms of the invention described in the foregoing it has been found advantageous to provide a thin lubricant film, of suitable character, between the plastic mass being advanced under pressure and the confining surfaces of the mandrel and the forming and shaping passages of the surrounding structure. This brings about various advantageous results. In the first place, it reduces the magnitude of the pressure required to force the plastic material through the forming and shaping passages at whatever temperature may be employed. With lubrication of the character mentioned the pressure under which the plastic is advanced may be reduced to, say, 7000 to 9000 p.s.i., whereas without lubrication considerably higher pressures within the range earlier specified herein will be required. Moreover, with proper lubrication it is not so important to maintain the plastic at the temperatures above indicated during its passage through the forming regions of the structure described. It has been found that the wedging action due to the formation of polymer skins is avoided, even if the plastic mass being advanced under pressure is cooled to a temperature below its crystalline melting point. This makes it possible to vary somewhat the temperatures maintained at various points of the members providing the forming passage and even of the plastic mass itself. Thus these temperatures may be carried at various points below the crystalline melting point of the plastic. This makes it possible to cool the outer portion of the plastic as it leaves the crosshead connected with the extruder, or other pressure applying means, to a temperature below its crystalline melting point, so that a polymer skin may be formed, in a first forming section of the system and then bring the temperature of the formed plastic mass to the desired temperature for the shaping and molecular orientation thereof, by addition or removal of heat or both, before the plastic reaches the shaping zone.

Figure 8:
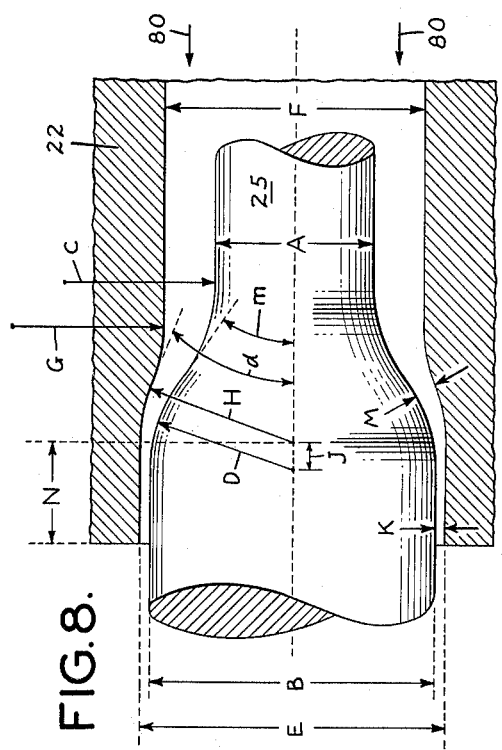
FIG. 8 is a schematic view showing the preferred form of the two shaping dies which provide the passage through which the plastic material is forced in the course of extruding and biaxially orienting the same.
Figure 10:
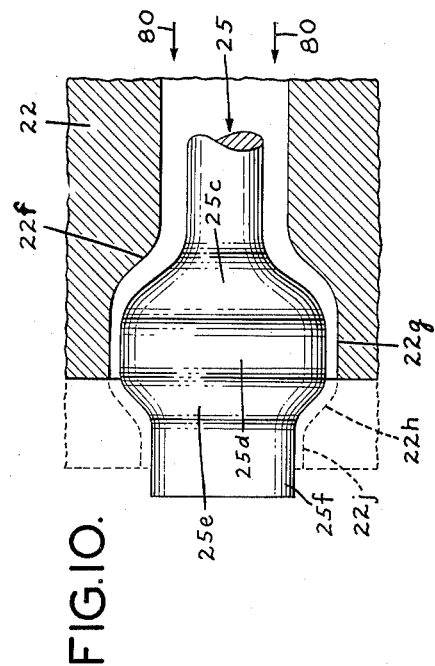

A preferred form of the mushroomed portion of the mandrel and the cooperating portion of the female die member of apparatus constructed in accordance with the invention is schematically indicated in FIG. 8. This shows the female die member 22 and the mandrel 25 in the shaping passage in which biaxial orientation of the tubing formed from the molten plastic mass takes place. The direction of movement of the tubular mass of plastic is indicated by the arrows 80. The mushroomed portion of the mandrel is gradually increased in radius from the main, small diameter cylindrical portion of the mandrel by a surface which, in longitudinal cross-section, is defined by an ogee curve. The initial portion of this curve is formed along an arc defined by the radius C. The arrow at the lower end of that radius indicates the point of merger of the curve into the cylindrical, small diameter portion of the mandrel. The remainder of the ogee curve is defined by an arc denoted by the radius D. At its lower end this arc merges into the upper end of the arc described by the radius C. At its upper end the arc of radius D merges into the enlarged cylindrical portion of the mandrel at a point vertically above the lower end of the radius D. In a similar manner the cooperating surface of the female die member 22 is formed by an ogee curve defined in part by the radius G and in part by the radius H. These two arcs merge into each other and one merges into the cylindrical inner surface of the die member 22 at the point designated by the arrowhead on radius G and the other merges into the larger cylindrical surface of the passage through member 22 at a point vertically in line with the lower end of the radius arm H. From this point on to the left end of the member 22, the surface defining the passage through the member 22 is cylindrical for a distance designated N. The diameter of the opening in this region is indicated by E while the diameter of the enlarged cylindrical portion of the mandrel is indicated by B.

Figure 14:
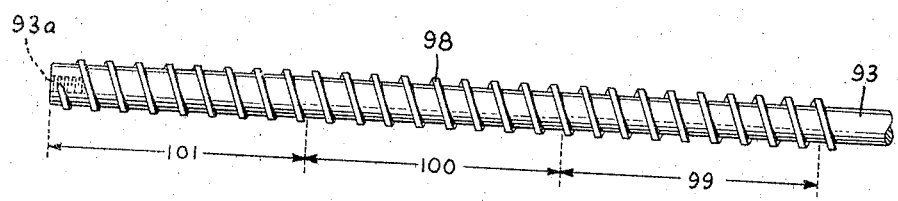
FIG. 14 is a detail view showing the form of the feed screw member provided in the extruder of FIG. 13.

While considerable variation may be made in the various dimensions indicated and in their relationship, it has been found desirable to stay within certain limits, particularly with respect to the relationship of various dimensions. In the first place, it may be stated that the mushroomed head of the mandrel is subjected to a very substantial force in the direction of the arrows 80 which tends to stretch the mandrel and it may, under certain circumstances, become so great as to cause rupturing of the mandrel or produce such elongation of the latter as to interfere seriously with the desired relationship between the mandrel and the female die. It is therefore important that the smaller diameter cylindrical portion of the mandrel be of sufficient dimension to resist such forces. Also the mandrel should be made of maa suitable bearing unit of the character disclosed in FIG. 3, see parts 19, 20, etc. Extending vertically upwardly from the housing 90 is a hopper 95 arranged to receive pellets of the plastic to be extruded. The lower end of the hopper is arranged to communicate with the bore 92 in a region near the right end of the spirally grooved portion of the screw. Electrical heating units 96 and 97 surrounding the housing 90 in the region of the initial portion of the path of advance of the plastic by the screw serve to heat the plastic to a temperature above its melting point, preferably between 400° and 450° F. The screw 93 may have a spirally grooved portion, say 24" in length, this being divided into three different zones 8" in length. In a unit constructed in accordance with the invention the outside diameter of the screw may be 1½" and the screw helix may have a constant pitch of 0.873" throughout its length. The first or right hand section 99 (FIG. 14) of the helically grooved portion of the screw serves as a feed section having a constant root diameter of 1.150". This feeds the material into a compression section 100 which has a uniformly tapering root diameter varying from 1.150" at its right end to 1.356" at its left end, thus providing a diametral taper of 0.026 per inch of screw length. The third section 101 of the screw, at the left end thereof, serves as a metering section of constant root diameter of 1.356". This arrangement is such that the mid-section of the screw, by virtue of its constantly decreasing depth of the helical groove, serves to build up a pressure on the plastic to the magnitude above mentioned. At its extreme left end the screw 93 is provided with a screw threaded bore arranged to receive the screw threaded stem 87 of a mandrel 86 of the character hereinabove described.

With the left end of the housing 90 there is adapted to be connected any suitable form of die structure for the formation and shaping of tubing from the molten plastic which is oriented both longitudinally and transversely of the tube axis in accordance with the invention. The die structure for this purpose may be similar to that shown in FIG. 12, and may include a female die member 49 secured to the end of the housing 90 by means of a ring 47 and bolts 48. An electrical heating jacket 57 may be provided around the die member 49 adjacent its mid point and a cooling jacket 58 may be provided adjacent the shaping region of the die structure. The mandrel employed in this unit may, as stated, be similar to the mandrel 86 of FIG. 12. As will be apparent, other die structures of the character hereinabove described may be used in lieu of that illustrated in FIG. 13.

Figure 15:
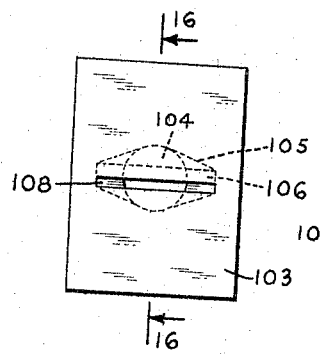
FIG. 15 is an end elevational view of a die structure capable of forming strip material from a molten plastic delivered under a high pressure by an extruder system, the strip being substantially oriented in a longitudinal direction as it is forced through the shaping passage.
Figure 16:
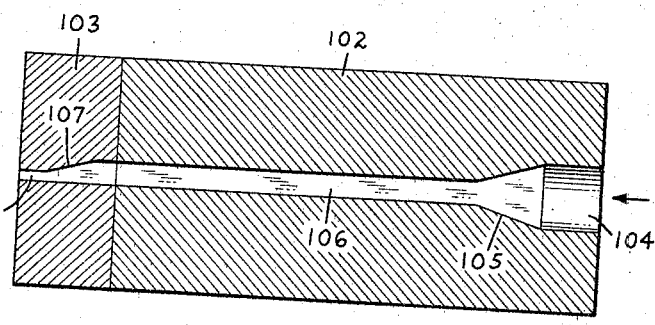
FIG. 16 is a vertical sectional view taken along the line 16—16 of FIG. 15.

In FIGS. 15 and 16 there is shown a die structure capable of forming a continuous strip of the plastic material with longitudinal orientation imparted thereto as the material is advanced through the die structure by the extrusion equipment. For convenience in varying the form of the final strip to be produced, the die structure may be provided with a detachable extension 103 which may be rigidly secured to the main body 102 of the die structure by bolts or the like. Any suitable means may be provided for connecting the main body 102 of the die structure to the end of a booster pump of the character hereinbefore described or to the end of the extruder housing 90 of the unit shown in FIG. 13. Suitable flanges and bolts may be employed for this purpose and appropriate sealing means, such as an O-ring, should be provided at the juncture of the die unit 102 with the housing of the booster pump or special extruder. Extending centrally through the members 102 and 103 is a forming and shaping passage for the plastic received from the booster pump or extruder. This passage has a cylindrical portion 104 at its right end which is of the same diameter as the passage within the booster pump or the housing 90 of the special extruder of FIG. 13. Extending toward the left from the cylindrical portion 104 of the passage is an appropriately shaped transition portion 105 which serves to convert the mass of plastic from its cylindrical form within the portion 104 to a flat form of rectangular cross-section within a portion 106. The latter, as best shown in FIG. 15, is relatively wide but small in height. The cross-sectional area of the portion 106 of the passage is preferably substantially the same as that of the cylindrical portion 104. Portion 106 of the passage extends a short distance into the member 103 of the die structure and then a downwardly sloping surface 107 at the top of the passage, inclined at an angle of about 8° to the bottom wall, serves to reduce the height of the strip being shaped until it equals that of the discharge end 108 of the passage. The height of the portion 108 of the passage may, for example, be ⅓ the height of the portion 106. By virtue of this convergence of the upper and lower walls, a substantial reduction in the cross-sectional area of the material being advanced, as measured in a plane transverse to the direction of movement of the plastic, is brought about. This results in longitudinal orientation of the plastic because of the increased length of a strip of the material formed from a given volume or weight of the plastic as compared with the longitudinal dimension of the same volume or weight of plastic within the portion 106 of the passage. A corresponding increase in the longitudinal tensile strength of the final strip is thus produced. If desired, the shaping region 107 of the passage may have top and bottom surfaces which converge toward each other to merge into the discharge end 108 of the passage, which will then be more centrally disposed within member 103.

It will be understood that a suitable heating jacket and heat insulating covering may be provided around a portion of the member 102 of the die structure to prevent conversion of the molten plastic into a solid state at any substantial distance in advance of the shaping portion 107 of the die passage. Adjacent the shaping region of the latter a cooling jacket is provided around the member 103 of the die structure to reduce the temperature of the plastic to a point sufficiently below its crystalline melting point at the existing pressure to enable the plastic to accept and retain molecular orienation.

As a typical example, the die structure of FIGS. 15 and 16 may be used in the production of high density (linear) polyethylene strip material having a longitudinal tensile strength of from 10,000 to 15,000 p.s.i., as compared with about 3000 to 4000 p.s.i. for unoriented material. The plastic is introduced into the cylindrical portion 104 of the die passage at a temperature of 375° to 400° F. and under a pressure of 14,000 to 15,000 p.s.i. In flowing through a preform passage 106 the plastic is cooled to about 250° F. at the juncture with the cooling section 103. Here the pressure is about 12,000 p.s.i. Within the cooling and shaping section the temperature is rather abruptly dropped to between 235° and 245° F. and the cross-sectional area of the strip is reduced to about ⅓ of that in the passage 106. The finished strip may, for example, be .500" wide and .036" thick and it emerges from the outlet 108 at a temperature of 230° F. or lower.

Figure 17:
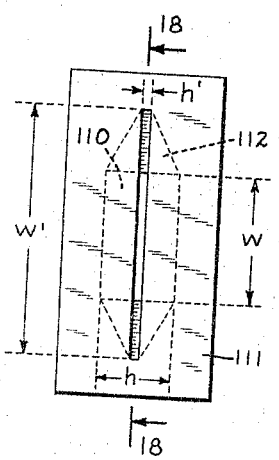
FIG. 17 is a view similar to FIG. 15 but shows a die capable of producing both longitudinal and transverse orientation of the plastic material in the course of forming it into a continuous strip.
Figure 18:
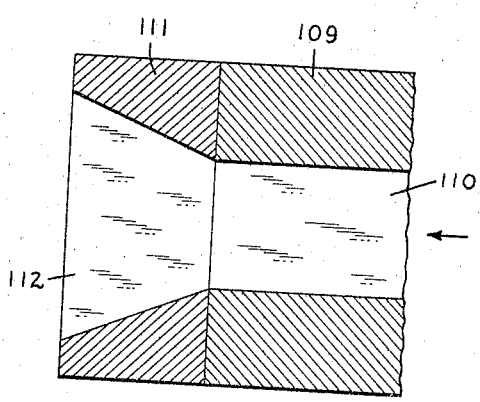
FIG. 18 is a longitudinal sectional view through the downstream end of the die of FIG. 17 taken along the line 18—18 of FIG. 17.

In FIGS. 17 and 18 a modified die structure for producing a continuous strip of plastic is shown, this structure being adapted to impart both longitudinal and transverse orientation to the plastic. The die structure for this purpose comprises a main body 109 which may be generally similar in construction to the member 102 of FIG. 16. It has a passage 110 of rectangular cross-section having a height and width indicated by the rectangular dotted line outline in FIG. 17. The plastic is delivered into this passage from an extruder which discharges the plastic into a cylindrical portion of the passage which is followed by a transition portion, similar to the portions 104 and 105 of FIG. 16. From the passage 110 the material is forced into a passage 112 which diverges in width and converges in height, this part of the passage being provided, for experimental purposes, in a detachable and replaceable section 111 of the die structure. The top and bottom surfaces of the portion 112 of the passage converge toward each other in the direction of flow at an included angle of about 20°. Preferably this portion of the passage has a rectangular cross-section in any plane perpendicular to the direction of flow. In its course of movement through the portion 112 of the die passage the width of the strip material is increased from the dimension $w$ in FIG. 17 to the dimension $w'$, which may be a ratio of, say, 1 to 2, while the height is decreased from the dimension $h$ to $h'$, which may be a ratio of, say, 6 to 1. The increase in the width of the strip results in transverse orientation while the decrease in height results in longitudinal orientation, the extents of which are commensurate with the ratio of $w:w'$ and $h':h$, respectively. It will be understood that a heating jacket and heat insulation may be provided around a portion of member 109 and a cooling jacket may be provided around member 111, so that the plastic may be maintained at a temperature above its crystalline melting point at the existing pressure up to a position just in advance of the shaping passage in member 111, and its temperature may be reduced to a point below its crystalline melting point within the member 111.

It has been found that the biaxial orientation of plastic tubing in accordance with the present invention may be used to advantage in the production of sheets or film-like material. For this purpose a further expansion of the initial tubing formed in accordance with the invention is produced to further increase the orientation of the plastic in both a longitudinal and a transverse direction after the initial tubing emerges from any of the tube forming die structures described above, but with the mandrel terminating in the same transverse plane as the female die member. An arrangement for accomplishing this is schematically shown in FIG. 19. Here the initial tube forming and shaping passages are provided by an appropriately shaped central opening through a female die member 113 and the cooperating outer surface of a mandrel 114 having a mushroomed formation adjacent its downstream end. The shape of the passage between the inner wall of the die member 113 and the outer surface of the mandrel 114 may be of any of the forms hereinbefore described, to provide both longitudinal and transverse orientation of the plastic. Mandrel 114 must be provided with a central bore or passage 116 which may be similar to that provided in the mandrel 51 of FIG. 6. In fact, the means for producing the initial biaxially oriented tubing may, by way of example, be of the character disclosed in FIG. 6. However, in lieu of introducing a cooling medium into the interior of the mandrel by the pipe 65 of FIG. 6, there will be introduced air or other gaseous medium under sufficient pressure to impart an adequate stretching force to the tubing as it emerges from the passage formed by the die member 113 and mandrel 114. Thus, as the initial tubing emerges with a wall thickness predetermined by the shaping passages of the die structure, as indicated at 117 in FIG. 19, it becomes subjected to a transverse stretching force, and to some extent a longitudinal stretching force, by the air introduced under pressure, until it assumes the thinner wall construction indicated at 118. Such air is confined within the stretched or ballooned tubing by leading the latter through a pair of pinch rolls 119 and 120 which serve to squeeze the walls of the tubing together and feed them forwardly as a two-layer sheet structure. In starting up the equipment the tubing emerging from the end of the die structure may be led to the pinch rolls before the air under pressure is introduced. This will result in a relatively small section of scrap. One or both of the pinch rolls 119, 120 may be driven at a suitable speed to feed the ballooned or expanded material at the rate at which it is being formed or, if desired, at a more rapid rate, so as to impart a still further longitudinal stretch to the material with resultant increased longitudinal orientation. The extent to which the initial tubing is expanded by the air under pressure may be regulated by simply controlling the pressure within the ballooned area or it may be determined, with greater certainty of uniformity, by surrounding the ballooned area by an open-ended cylinder 121 of appropriate diameter. The air under pressure would then expand the initial tubing until a portion of it engages the inner surface of the confining cylinder and the pinch rollers 119 and 120 would serve to draw the expanded or ballooned tubing a certain distance along the inner wall of the cylinder and then carry it downwardly into the bite of the pinch rollers. The initial tubing discharged from the die structure at 117 may have a mean diameter of, say, 3″ while the ballooned tubing may have a diameter of, say 36″. The open-ended cylinder 121 would in such case have an internal diameter of 36″. In some instances it may be found desirable to reheat the tubing as it emerges from the passage between the die 113 and mandrel 114 either before or during its expansion by the action of the air introduced through the passage 116. Such reheating should not, however, raise the temperature of the tubing to its crystalline melting point. Its temperature should be maintained at a point below that at which any substantial loss will result in the initial orientation imparted to the tubing in the shaping region of the die.

By the arrangement just described it is possible to form sheets or films, of plastic material of a character capable of accepting a high degree of orientation, which are of exceptional tensile strength in both the longitudinal and the transverse direction. It will be understood that after the collapsed tubing has advanced through the pinch rolls 119, 120, the tubing may be slit longitudinally or cut along its two edges to form two sheets of plastic material of any desired length.

Turning now to FIGS. 20–27, inclusive, there is shown a modified construction provided with means for delivering a closely regulated amount of lubricant to the outer and inner surfaces of the tubular member being formed. In this modified construction it has been found possible to operate at higher speeds than in the earlier specific forms described, and with the plastic forced through the unit under a substantially lower pressure. The arrangement is such that the maintenance of a desired temperature in the shaping region of the unit may be more readily and uniformly accomplished. This is due to the possibility of more quickly cooling the plastic material in the early stages of its passage through the tubular channel, with subsequent application of heat to bring the plastic to the desired temperature. The resulting formation of a skin, solidified plastic, at both surfaces of the plastic, due to the early and rapid cooling of the same, has been found not to be objectionable when appropriate lubrication is provided at the two surfaces of the tubular plastic mass.

The modified construction embodies a cross-head member 125 which may be generally similar to the member 38 shown in FIG. 6. It is provided with a frusto-conical inlet 126 adapted to be connected with the outlet of a suitable extruder. The latter need only be capable of developing a pressure of between 7,000 and 9,000 p.s.i., and therefore a conventional extruder may be employed, without the necessity of providing a booster between the extruder and the cross-head inlet. From the inlet 126 the plastic is forced through a cylindrical passage 127 in the cross-head, from which it is delivered at right angles to the passage 128 in the cross-head. Connected with the latter, at the outlet end of the passage 128, is an adapter 129 having a passage therethrough alined with the passage 128 but converging in diameter from that of the passage 128 to a smaller diameter adjacent the discharge end of the adapter. Any suitable means, of the character to be hereinafter described, may be provided for retaining the adapter in proper assembled relation with the cross-head. Preferably an O-ring 130 is provided between the adjacent faces of the adapter and the cross-head to maintain an effective seal under the pressures established within the passages mentioned.

At the outlet end of the adapter there is provided a heat insulating ring or annular member 131 having an opening therethrough alined with the discharge end of the opening through the adapter. Outwardly, i.e. downstream, of the heat insulating member is a lubricant delivering and controlling structure which is preferably formed by two members 132 and 133. These are retained in assembled relation and urged against the downstream face of the heat insulating ring 131, in the manner to be explained, and serve to provide an extension of the passage within the adapter. Cooperating with the adapter 129, ring 131 and members 132, 133 is a forming section 134 of the unit. This is provided with a longitudinally extending bore alined with the passages through the earlier parts described. A second forming section 135 cooperates with the discharge end of the section 134 and is provided with a central bore forming a passage for the plastic material alined with the passage in the section 134. At the downstream, or delivery end of the section 135 there is provided a further section 136 having a longitudinally extending bore, the major portion of which is of the same diameter as the bore of section 135, but toward the discharge end of section 136 the bore is gradually increased in diameter and then maintained at the increased diameter for a short distance. This, as will be explained, serves to provide the desired shaping passage.

To retain the various members described above in assembled relation, an annular member 137 is mounted upon the section 136 and adapted to cooperate with a radially outwardly extending flange at the upstream end of the latter. Member 137 is provided with a suitable number of openings for the reception of retaining bolts 138, the right ends of which are screw threaded into corresponding openings provided in the cross-head 125. Intermediate the cross-head and the member 137 there is provided another annular member 137a, similar to member 137 but having a slightly smaller bore therethrough, cooperating with an extension at the downstream end of forming section 134. Nuts 139 provided on the bolts 138 may be suitably tightened to urge the member 137a, forming section 134, members 132, 133, ring 131 and adapter 129 into firmly seated relation to each other and to retain the adapter firmly against the outlet side of the cross-head. Similarly, nuts 140 having screw threaded engagement with the bolts 138 are arranged to urge the members 136 and 137 toward the right and thus retain the member 136 in firmly seated engagement with the downstream end of forming section 135.

Extending longitudinally of the bores within the members 129, 131, 132, 133, 134, 135 and 136 is a hollow or tubular mandrel 141. This extends from a point within the adapter 129 to the outer end of the shaping section 136. Its outside diameter is such as to provide a suitable clearance in relation to the wall defining the bore in each of the members mentioned, thus forming an annular passage through which the plastic material may be forced. At its right or upstream end the mandrel is provided with an external screw thread 141a and at its left or downstream end it is provided with an internal screw thread 141b. In FIG. 22 the root or depth of the thread 141a is indicated by the line 141c. Four grooves 141d, spaced 90° apart, are cut into the threaded portion 141a of the mandrel to a depth slightly greater than the root of the thread. As will be later explained, this provides four restricted passages for the delivery of lubricant along the threaded portion of the mandrel. At its right end the mandrel is provided with a mushroomed head 142 which may suitably have the configuration of any of the mushroomed heads hereinabove described. This head may, if desired, be formed integrally with the tubular body of the mandrel, but it has been found desirable, for the purposes of greater accuracy and simplicity of construction, to form the head as a separate element adapted to be applied to the end of the mandrel with a snug fit. This separate head 142, best shown in FIG. 26, may be firmly secured to the end of the mandrel by a screw element 142a. The member 142 has an inwardly turned flange 142b at its outer end providing a shoulder for cooperation with the end of the tubular member 141. At its inner end the head 142 is provided with a surface 142c which is adapted to form the inner wall of the shaping passage of the unit. It is important that the extreme inner end of the member 142 be feathered to form a sharp, rigid edge merging into the outer surface of the member 141. As best shown in FIG. 27, the screw element 142a has an externally threaded shank 142d adapted to cooperate with the threads 141b of the mandrel. Extending through the element 142a is a bore 142e of suitable diameter for the passage of a coolant, such as water or the like, which is forced through the mandrel in the manner to be explained. Screw element 142a has a shoulder arranged to cooperate with the outer face of the flange 142b of member 142 to retain the latter firmly connected with the member 141. The outer end of screw element 142a preferably has a diametrically extending groove or slot 142f alined with the passage 142e to facilitate the discharge of the coolant into the tubing which is being formed as the plastic material is forced through the shaping passage provided between the outer surface of member 142 and the mushroomed end of the bore extending through the sleeve 136.

A sleeve 143 receives and supports the upstream or right end of the mandrel 141 to retain the latter centrally within the various bores through which it extends. Sleeve 143 has an internally threaded portion 143a arranged to cooperate with the threads 141a of the mandrel. At an intermediate point the sleeve 143 is slightly enlarged to provide a shoulder 143b arranged to cooperate with a corresponding shoulder provided in the cross-head 125 in axial alignment with the passage 128. At its outer or right end the sleeve 143 is provided with external threads 143c with which cooperate a nut 144a. The latter may be tightened into firm engagement with the outer surface of the cross-head 125 or a plate 144 forming an extension of the cross-head, as shown in FIG. 20. When such a separate plate or disc is employed it may be secured to the cross-head by bolts 144b. The sleeve 143 passes through a bore in the wall of the cross-head and the plate 144 and any suitable means may be provided for effecting a seal between the sleeve and the supporting walls to prevent outflow of any of the plastic being forced through the passages 127 and 128.

On the outer end of the sleeve 143 there is mounted a block or connection member 145 having internal screw threads for cooperation with the threads 143c. Block 145 has an opening therethrough in axial alinement with the sleeve 143 through which a tube 146 may be passed into the sleeve 143 and into the upstream end of the mandrel 141. A coupling 147 serves to retain the right end of the tube in a centralized position in relation to sleeve 143, and it also serves as a means for connecting the tube 146 with a source of supply of a cooling medium, such as water. The coolant delivered through the connection 147 into the tube 146 is passed under a suitable pressure through the latter into the interior of the mandrel and is then discharged at the downstream end of the mandrel, into the interior of the plastic tubing being formed. The portion of the tube 146 which extends into the upstream end of the mandrel is preferably brazed to the inner surface of the latter to form an effective seal. It will be understood that in the continuous production of plastic tubing in the unit being described, suitable provisions may be made for the cutting of the plastic tubing into desired lengths so that the coolant may be drained from each section of tubing as it is formed and cut from the succeeding length of tubing.

For the purpose of supplying a lubricant to the inner surface of the plastic tubing as it first begins to change to the solid state, the member 145 is provided with a screw threaded opening 148 for the reception of a fitting connected with a source of lubricant under pressure. The lubricant should be delivered under a high pressure, that just balances the pressure under which the plastic material is being advanced. However, it has been found important to carefully regulate or limit the rate of flow of the lubricant so that it is just sufficient to accomplish its purpose, i.e. of providing a thin lubricant film between the mandrel and the inner surface of the tubular plastic mass. For this purpose it has been found that about 1 cu. in. of lubricant for 300 cu. in. of polymer is desirable. If an excessive amount of lubricant is supplied to either surface of the tubing as it is being formed, this has been found to produce unsteady operation of the unit due to spasmodic discharge of the excess to atmosphere at the downstream end of the unit. In general, the lubricant employed should meet the following specifications:

(1) Inert to the polymer
(2) Non-miscible with the polymer
(3) Flat viscosity vs. temperature characteristic
(4) Liquid at room temperature
(5) Low vapor pressure at the maximum temperature to which it is exposed
(6) High flash point When linear polyethylene was used, the following lubricants were used successfully:

(1) Butoxy poly(oxyethylene-oxypropylene) glycol, having an average molecular weight of approximately 2600
(2) Silicone oils and greases
(3) Ethylene glycol
(4) Castor oil
(5) Petroleum oils
(6) Water In forming solid "Delrin" acetal resin rods, all of the above items have been used; in forming solid polypropylene rods, items 1, 2, 3 and 4 have been used. In all cases, the butoxy poly(oxyethylene-oxypropylene) glycol lubricant has been found preferable.

The lubricant introduced into the member 145 through the opening 148 passes into a cavity 149 surrounding the tube 146. A lateral extension of this cavity provides an annular passage around the tube 146 which communicates with the upstream end of the sleeve 143. The lubricant then flows downstream along an annular passage provided between the outer surface of tube 146 and the inner surface of sleeve 143. As the lubricant reaches the upstream end of the mandrel it is forced through the inner portions of the passages 141d which, as explained above, extend radially inwardly a slight distance beyond the root diameter of the screw threads 141a of the mandrel. These passages may suitably be about 0.062" wide and approximately 0.010" deeper in the radial direction than the thread 141a.

At the downstream end of the threaded portion 143a of the sleeve 143, the latter is provided with a small pocket 143d in cooperation with the adjacent portion of the mandrel 141. From the pocket 143d the lubricant is forced through a series of shallow and narrow grooves 143e provided in the inner surface of the sleeve 143. In the example shown, 12 such grooves are provided and these may suitably be 0.005" deep in the radial direction and 0.010" wide in the circumferential direction. Thus, only a limited amount of lubricant will be forced, under the pressure employed, through the passages 143e, and this lubricant will then be delivered as a light film to the outer surface of the mandrel 141 and from the latter to the interior surface of the tubing being formed. As shown in FIGS. 20 and 23, the downstream end of the sleeve 143 is tapered inwardly, as shown at 143f, to provide a quite sharp knife-like edge at the end of the sleeve.

It should be noted that the provision of the grooved section 143e in the sleeve enables the latter to retain the mandrel in properly centered relation to the sleeve and also the forming sections and the like of the unit as a whole.

Provision is also made for the delivery of a limited amount of lubricant to the outer surface of the tube being formed. This is accomplished through the members 132 and 133 (FIGS. 20 and 24). These members are mounted in a cylindrical cavity provided in the upstream end of the forming member 134. In the region of this cavity the member 134 is provided with a threaded opening 150 adapted for the reception of a fitting connected with a suitable source of lubricant under high pressure, which may be the same source that is connected with the inlet 148. A radially extending passage 151 communicating with the opening 150 has a laterally extending portion which is open toward one side of the lubricant control unit 132, 133. Thus a channel is provided for the delivery of lubricant into an annular groove or passage 152 in the adjacent face of the member 133. Spaced radially inwardly, and also laterally, of the annular passage 152 is another passage 154 which is of slightly smaller cross-section than the passage 152. These two annular passages are interconnected by a series of, say, four passages 153, each of which may suitably be of a diameter of 1/16". From the annular passage 154 the lubricant is delivered through a still narrower annular passage 155, which communicates with the plastic receiving bore of the unit. The passage 155 may suitably be 0.005" wide in the axial direction of the unit. The two annular passages 154 and 155 may be formed by cooperating surfaces on the two members 132 and 133, as best shown in FIG. 24. The flow controlling passages of the unit 132, 133 are such that a thin film of the order of 0.0001" to 0.00025" thick will be applied to the outer surface of the plastic tubing being formed. A similar thin film will be applied to the inner surface of the tubing by the above-described means.

It will be understood that in the operation of the unit now being described, the plastic material may be fed in pellet form into the hopper of a suitable extruder. Within the extruder the material is heated to a point well above its crystalline melting point and it is then forced by the feed screw of the extruder into a passage communicating with the opening 126. As the plastic material is advanced through the unit, it is subjected to heating and cooling actions at various points to insure the proper formation of the desired tubing and to bring the tubing to the predetermined temperature as it is forced through the orienting and shaping passage provided between the members 136 and 142. The temperature at which the working of the plastic to bring about desired orientation takes place should conform with what has been said in connection with earlier embodiments of the invention. This temperature should be below the crystalline melting point of the plastic and one at which the plastic will readily accept and retain molecular orientation.

To insure proper movement of the plastic through the cross-head and the adapter, under conditions which will permit the plastic to flow and maintain its integrated state as it is converted from the cylindrical form in passage 127 to the tubular form in passage 128, it has been found desirable to supply additional heat in this portion of the apparatus. For this purpose an electric heating unit 156 is provided around the inlet end of the cross-head. Similarly, an electric heating unit 157 has been provided around the member 144 and a portion of the adjacent end of the cross-head. Also a heating unit 158 has been provided around the adapter. As plastic advances beyond the heat insulating washer 131, it has been found desirable to subject it to a rapid cooling action, which is preferably applied to both the inner and the outer surfaces of the plastic. The means for imparting a cooling action to the inner surface of the plastic tubing as it is being formed has already been described, this being imparted by the coolant delivered through the tube 146 and the interior of the mandrel. Such coolant may be delivered at substantially room temperature, i.e. about 70° F. For cooling the external surface of the tubing, the forming section 134 is preferably cooled by a suitable cooling medium, such as water, also delivered at about room temperature. For this purpose the coolant may be delivered through a pipe 159 to a chamber 160 forming the initial end of a spiral passage 161 extending around and along the outer surface of the member 134. A chamber 162 at the opposite end of this spiral passage delivers the coolant to a discharge pipe 163. As a convenient way of providing the spiral passage mentioned, a spiral groove of suitable depth, width and pitch may be provided in the outer surface of the member 134 and a sleeve 164 may then be applied over the member 164 to completely enclose the spiral passage. A retaining ring 164a may then be applied to the member 134 for holding the sleeve 164 in place. Suitable sealing means, such as O-rings 165, may be provided between the various cooperating surfaces of the members 134, 164 and 164a.

In a similar manner the second forming section 135 may be provided with cooling means including an inlet pipe 166 arranged to deliver a cooling medium, such as water, and the like, at substantially room temperature, to a spiral passage 167, 168 and 169, from the latter of which the coolant is discharged through a pipe 170. A sleeve 171, retaining ring 172 and sealing means, such as O-rings 173, may be provided for enclosing the passage.

Cylindrical member 136 is preferably provided with an electric heating unit 174 adapted to supply sufficient heat to the member 136 to bring the temperature of the plastic up to the desired point as it is forced through the shaping passage.

In order to control the operation of the unit effectively to insure the best temperature conditions at various points in the passage of the plastic through the unit, suitable temperature indicating or recording devices are employed. These are indicated simply schematically in FIG. 20. They may be of the thermocouple type, suitable openings being provided at various points in the system for insertion of the thermocouples. One of these is illustrated schematically at 175 in FIG. 20, this being for the purpose of determining the temperature of the cross-head in the region near the passage 127 into which the molten plastic is originally introduced. It has been found desirable to locate the inner end of the thermocouple about $\frac{1}{16}''$ from the bore forming passage 127. Another thermocouple 176 is provided just beneath the turn between passages 127, 128. It has been found desirable to locate the inner end of this thermocouple about $\frac{7}{8}''$ from the bore forming passage 128. A third thermocouple 177 is provided adjacent the downstream end of the sleeve 143, and the inner end of this thermocouple preferably projects into the path of the molten plastic so as to give a clearer indication of its temperature at this point. A fourth thermocouple 178 is provided on the downstream side of the insulating washer 131 and the lubricating unit 132, 133. The inner end of this thermocouple should be flush with the bore through the forming section 134. It should not project into the annular passage through which the plastic is forced in this region, since the outer surface of the plastic may begin to solidify in this region. Still another thermocouple 179 is provided adjacent the upstream end of the forming section 135. It has been found desirable to locate the inner end of this thermocouple about $\frac{1}{16}''$ outwardly from the bore through the member 135. A further thermocouple 180 is extended through the wall of the cylinder 136 to a point about $\frac{1}{16}''$ from the bore through that cylinder. This provides some indication as to the temperature of the plastic tubing just in advance of the shaping passage. A final thermocouple 181 is provided at the outer end of the cylinder 136 and is arranged to extend parallel with the axis of the bore through that cylinder at a point about $\frac{1}{16}''$ from the bore. This serves to provide some indication as to the temperature of the plastic material as it leaves the shaping zone.

The following table indicates the preferred temperatures to be maintained at the various points of the system where the thermocouples are located. It also indicates a permissible deviation in the temperature at the various points in question. This is when the system is being used for the production of tubular members formed of linear polyethylene suitable for use as cartridge shell casings.

| Thermocouple No. | Preferred, ° F. | High, ° F. | Low, ° F. |
|---|---|---|---|
| 175 | 450 | 475 | 400 |
| 176 | 450 | 475 | 400 |
| 177 | 350 | 400 | 325 |
| 178 | 150 | 250 | 50 |
| 179 | 240 | 250 | 220 |
| 180 | 240 | 250 | 220 |
| 181 | 240 | 250 | 220 |

It should be understood that the temperatures above indicated for the various points of the system are not the temperature of the plastic material in those particular regions. In some instances the temperatures indicated are reasonably close to the temperature of the plastic material, but in other instances they depart quite widely from the plastic material temperature. They nevertheless provide an indication as to the temperature which is being maintained in all of the various regions of the unit, and this has been found to provide an adequate indication of the need for either increasing or decreasing the temperature of the unit at the various points.

By maintaining the indicated temperatures at the various points in the several regions of the continuous forming and shaping passages of the unit it has been found possible to maintain the plastic at the desired temperatures for the most efficient advance and biaxial working thereof to produce the desired results.

In connection with the foregoing, it is desired to explain that while it has been found desirable, for the more rapid production of the biaxially oriented tubing, to provide the various heating and cooling means described, some or all of these heating and cooling means may be eliminated by appropriate lengthening of the annular passage through which the plastic polymer is forced. The molten polymer delivered from an extruder may be brought to an appropriate temperature for gradual solidification at its outer and inner surfaces by its normal passage through the unit, and a thin lubricant film may be applied to such surfaces at the points where they begin to solidify. The lubricant thus applied serves to reduce the frictional resistance to the advance of the plastic mass, thereby avoiding the danger of rupturing the solid skin that is formed and enabling the comparatively low pressure to advance the tubular mass at a suitable rate. Thus by predetermining the initial temperature of the selected molten polymer, the length of the passages through which it is forced, the rate at which it is advanced, the points at which the lubricant is applied to the inner and outer surfaces thereof, and the temperature of the surrounding atmosphere, the plastic polymer may be brought to the shaping zone of the unit at the desired temperature for the acceptance of molecular orientation.

Also it should be understood that the modified unit may be suitably adapted for the production of solid strips or rods of the polymeric material which have been oriented in the longitudinal direction or strips of the same which have been oriented both longitudinally and transversely in the manner heretofore described. For these purposes the forming and shaping passages of the unit may simply be modified in the manner hereinbefore suggested, to produce solid, rather than tubular, end products of the desired configuration. Thus in forming high tensile strength rods, the mandrel may be omitted and the shaping cylinder may simply be formed with a frusto-conical shaping section which will reduce the diameter of the original tubing to a desired extent and the discharge end of the cylinder may be provided with a short cylindrical passage of the desired reduced diameter.

While certain preferred forms of the invention have been described in considerable detail, it should be understood that various modifications, in addition to those expressly mentioned, may be made in the construction of the apparatus employed and its mode of operation, within the general principles of the invention defined by the appended claims. Thus, means other than an extruder, with or without a booster pump, may be employed to deliver the plastic in a readily flowable state to the orientating die structure. For example, a mass of plastic sufficient to form a desired length of tubing, or the like, may be forced through the die structure under the required pressure by means of a piston or ram driven from any suitable power source. Or a pressurized fluid, such as air, may be applied to a pool of the flowable plastic in a container to force it under the required pressure through the die structure. The latter will be provided with appropriate heating and cooling jackets of the character described to maintain the plastic at the desired temperatures specified herein within the various zones. Various materials may be employed in the construction of the several elements of the apparatus, so long as they have the required strength characteristics, resistance to corrosion, good heat tansfer characteristics in certain regions, and the capability of the mandrel and female die member of being provided with the desired smooth surfaces in the forming and shaping regions.

As used herein the terms "high crystallinity," "linear," "high density," "crystalline melting point," and the like, used in describing the plastics employed in the practice of the invention are to be understood as having the connotations and as being determined in accordance with the disclosure of said pending Covington et al. application, Serial No. 37,598.

What is claimed is:

1. A method of forming thermoplastic tubing that is capable of retaining its tubular form and is of high tensile strength in the longitudinal and transverse directions and is capable of resisting high rupturing forces in both the longitudinal and circumferential directions, which comprises:
   (1) forming a thick-walled relatively small diameter tube of highly crystalline thermoplastic material which is a substantially linear polymer having an annealed density of at least 0.94 and at least 90% of which is formed from ethylene,
   (2) forcing said tube under pressure through a tubular space formed between a mandrel and a stationary surrounding die while at a mean temperature at which it may be readily advanced under the pressure employed,
   (3) subjecting the tube as it is forced along said space to a heat transfer action to bring its temperature to between 20° and 50° F. below the crystalline melting point of the material at the pressure to which it is being subjected,
   (4) then advancing said tube through a channel between said mandrel and surrounding die which is of gradually but substantially increasing mean outside diameter and of gradually but substantially decreasing cross-sectional area, and
   (5) subjecting said tube to cooling as it continues to advance through a tubular extension of said channel.

2. A method of forming an elongated thermoplastic member of high tensile strength in both a longitudinal and a transverse direction which comprises:
   (1) continuously extruding a molten mass of a highly crystalline thermoplastic material which is a substantially linear polymer having an annealed density of at least 0.94 and at least 90% of which is formed from ethylene into a confining passage under a substantial force in excess of 7000 p.s.i.,
   (2) subjecting the extruded material as it is advanced through said passage by said force to a cooling action until the temperature of said material is brought somewhat below the crystalline melting point thereof but in a flowable state at the pressure under which it is being maintained,
   (3) causing said mass to advance under said force while at said temperature through a shaping channel forming an extension of said confining passage,
      (a) said shaping channel being of gradually smaller cross-sectional area and gradually increasing length in a transverse plane than said confining passage, and
   (4) further cooling the material as it is advanced by said force beyond said shaping channel.

3. A method of the character set forth in claim 2 in which said temperature of the material is at least 20° F. below said crystalline melting point.

4. A method according to claim 2 in which said confining passage and said shaping channel are adapted to cause said material to assume an annular configuration in cross-section throughout its longitudinal movement.

5. A method according to claim 2 in which said confining passage and said shaping channel are adapted to
   (1) cause said material to assume an annular configuration in cross-section throughout its longitudinal movement and to
   (2) increase in its outer diameter in its movement through said shaping channel.

6. A method according to claim 2 in which said material as it is caused to advance through said confining passage and said shaping channel is of rectangular transverse cross-section.

7. A method according to claim 2 in which said material is cooled to said temperature below the crystalline melting point substantially at the juncture between the said confining passage and the shaping channel.

8. A method of forming thermoplastic tubing that is capable of retaining its tubular form and is of high tensile strength in the longitudinal and transverse directions and is capable of resisting high rupturing forces in both the longitudinal and circumferential directions, which comprises:
   (1) advancing a thick walled relatively small diameter tube of highly crystalline thermoplastic material which is a substantially linear polymer having an annealed density of at least 0.94 and at least 90% of which is formed from ethylene
      (a) under high pressure of at least 7000 p.s.i., and
      (b) at a temperature between the crystalline melting point at the particular pressure and a temperature not more than about 50° F. below the crystalline melting point
      (c) through a channel between a mandrel and a surrounding die
      (d) which channel has a portion of gradually increasing outside diameter and of gradually decreasing cross-sectional area.

9. A method of forming elongated members of high tensile strength in both a longitudinal and a transverse direction from a highly crystalline synthetic polymer which is substantially linear in structure and has an annealed density of at least 0.94 and at least 90% of which is formed from ethylene, which comprises:
   (1) heating a mass of the polymer to a temperature above its crystalline melting point,
   (2) forcing the polymer under a pressure of at least 7,000 p.s.i. through a forming passage and then a shaping passage of gradually decreasing cross-sectional area,
   (3) cooling the polymer to a temperature of between about 20° and 50° F. below its crystalline melting point as it is advanced through the forming passage,
      (a) the polymer thereby being changed to a solid state, said change commencing at at least one surface of the mass, such as its outer surface, and gradually extending through the entire mass before it reaches the shaping passage, and
(4) applying a thin layer of lubricant to the surface of the mass at which solidification commences as such solidification is about to begin,
   (a) said lubricant layer being so applied as to substantially eliminate all frictional resistance between the polymer mass and all surfaces of the forming and shaping passages along which said mass is being advanced.

10. A method of the character set forth in claim 9 in which:
   (1) the forming and shaping passages are of annular cross-section, and
   (2) said layer of lubricant being applied to the inner and outer surfaces of the polymer mass substantially at the points along the forming passage at which solidification commences in the respective surfaces of the mass.

11. A method of the character set forth in claim 9 in which:
   (1) the outer surface of the polymer mass is subjected to rapid cooling as it is forced through the forming passage and
   (2) said polymer mass is subjected to reheating as it approaches said shaping passage.

12. A method of the character set forth in claim 11 in which said rapid cooling is applied in two successive stages through indirect heat transfer in relation to two separate streams of a cooling medium.

13. A method of the character set forth in claim 10 which includes the step of forcing a cooling medium through the mass of polymer in indirect heat exchange therewith to cool the inner surface thereof as it is being advanced through the forming passage.

14. A method of the character set forth in claim 13 which includes the step of passing a cooling medium in indirect heat exchange with the outer surface of the mass of polymer as it is being forced through the forming passage of annular cross-section.

15. A method of the character set forth in claim 14 which includes the step of applying additional heat to the outer surface of the polymeric mass as it approaches the shaping passage.

16. A method of forming thermoplastic films of high tensile strength in the longitudinal and transverse directions which comprises:
   (1) forming relatively thick-walled tubing of highly crystalline thermoplastic material which is a substantially linear polymer having an annealed density of at least 0.94 and at least 90% of which is formed from ethylene,
   (2) forcing said tubing under pressure through an elongated tubular passage while at a mean temperature at which it may be readily advanced under the pressure employed,
   (3) subjecting the tubing as it is forced along said passage to a heat transfer action to bring its temperature to between about 20° and 50° F. below the crystalline melting point of the material at the pressure to which it is being subjected,
   (4) then advancing said tubing through an extension of said passage which is of gradually but substantially increasing mean diameter and of gradually but substantially decreasing cross-sectional area,
   (5) collapsing and pinching together the walls of the tubing as it advances beyond the downstream end of the extension of said passage,
   (6) delivering a fluid under pressure through the interior of said passage and its extension into the interior of said tubing,
      (a) said fluid being under sufficient pressure to effect ballooning of the tubing as it is advanced beyond the downstream end of the extension of the passage, and
   (7) advancing the ballooned and collapsed tubing away from the passage and its extension.

17. A method according to claim 16 in which said tubing is heated to a desired temperature below its crystalline melting point as it advances beyond the downstream end of the extension of said passage.

References Cited by the Examiner

UNITED STATES PATENTS

| | | | |
|---|---|---|---|
| 2,465,482 | 3/1949 | Rhodes | 18—14 XR |
| 2,468,585 | 4/1949 | Bluma | 264—209 |
| 2,620,515 | 12/1952 | Olson | 18—14 |
| 2,771,637 | 11/1956 | Silvasy et al. | 18—12 |
| 2,957,201 | 10/1960 | Fields et al. | 18—14 |
| 2,972,780 | 2/1961 | Boonstra | 18—55 |
| 3,013,309 | 12/1961 | Maier et al. | 18—55 |
| 3,026,564 | 3/1962 | Kohlwey | 18—12 |
| 3,051,989 | 9/1962 | Mercer | 18—14 |
| 3,059,277 | 10/1962 | Pierce | 18—14 |

ROBERT F. WHITE, *Primary Examiner.*

ALEXANDER H. BRODMERKEL, MAURICE V. BRINDISI, *Examiners.*